US012739926B2

(12) United States Patent
Hori et al.

(10) Patent No.: US 12,739,926 B2
(45) Date of Patent: Sep. 15, 2026

(54) TERMINAL APPARATUS, BASE STATION APPARATUS, AND METHOD

(71) Applicant: Sharp Kabushiki Kaisha, Sakai City (JP)

(72) Inventors: Takako Hori, Sakai City (JP); Shohei Yamada, Sakai City (JP); Hidekazu Tsuboi, Sakai City (JP); Kyosuke Inoue, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 326 days.

(21) Appl. No.: 18/565,786

(22) PCT Filed: May 30, 2022

(86) PCT No.: PCT/JP2022/021944

§ 371 (c)(1), (2) Date: Nov. 30, 2023

(87) PCT Pub. No.: WO2022/255305

PCT Pub. Date: Dec. 8, 2022

(65) Prior Publication Data

US 2024/0260119 A1 Aug. 1, 2024

(30) Foreign Application Priority Data

Jun. 2, 2021 (JP) ................................ 2021-092658

(51) Int. Cl.

| | |
|---|---|
| ***H04W 76/20*** | (2018.01) |
| ***H04W 76/40*** | (2018.01) |
| *H04W 80/02* | (2009.01) |

(52) U.S. Cl.

CPC .......... *H04W 76/20* (2018.02); *H04W 76/40* (2018.02); *H04W 80/02* (2013.01)

(58) Field of Classification Search

CPC ....... H04W 4/06; H04W 76/20; H04W 76/34; H04W 76/40; H04W 80/02

(Continued)

(56) References Cited

U.S. PATENT DOCUMENTS

2021/0235535 A1* 7/2021 Hori ..................... H04W 76/30
2021/0297841 A1* 9/2021 Jung ..................... H04W 4/12

(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.2.0, Jul. 2020, pp. 1-148.

(Continued)

*Primary Examiner* — Robert J Lopata
(74) *Attorney, Agent, or Firm* — Keating & Bennett, LLP

(57) ABSTRACT

A terminal apparatus for communicating with a base station apparatus includes a receiver configured to receive a Radio Resource Control (RRC) reconfiguration message including a first parameter from the base station apparatus, and a processing unit. The processing unit performs first processing on each session not to be added with the first parameter among the sessions already configured for the terminal apparatus, based at least on that a parameter indicating a full configuration is included in the RRC reconfiguration message. The first parameter is an MRB configuration list parameter. The first processing includes indicating to an upper layer that a user plane resource for each session not to be added has been released.

3 Claims, 19 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0038878 | A1* | 2/2022 | Jung | H04W 4/14 |
| 2023/0199569 | A1* | 6/2023 | Cao | H04W 36/0061<br>370/331 |
| 2023/0231692 | A1* | 7/2023 | Baek | H04W 72/30<br>370/329 |
| 2023/0397232 | A1* | 12/2023 | Baek | H04W 72/30 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 16)", 3GPP TS 36.300 V16.2.0, Jul. 2020, pp. 1-390.

* cited by examiner

```
RadioBearerConfig ::=                SEQUENCE {
        <PARTLY OMITTED>
    srb-ToAddModList            SRB-ToAddModList      OPTIONAL,
    drb-ToAddModList            DRB-ToAddModList         OPTIONAL,
    drb-ToReleaseList           DRB-ToReleaseList     OPTIONAL
        <PARTLY OMITTED>
}
SRB-ToAddModList ::=        SEQUENCE (SIZE (1..2)) OF SRB-ToAddMod
SRB-ToAddMod ::=              SEQUENCE {
   srb-Identity             SRB-Identity,
        <PARTLY OMITTED>
   pdcp-Config                PDCP-Config             OPTIONAL,     -- Cond PDCP
   ...
}
DRB-ToAddModList ::=        SEQUENCE (SIZE (1..maxDRB)) OF DRB-ToAddMod
DRB-ToAddMod ::=            SEQUENCE {
   cnAssociation              CHOICE {
     eps-BearerIdentity          INTEGER (0..15),     -- EPS-DRB-Setup
     sdap-Config                 SDAP-Config          -- 5GC
   }                      OPTIONAL, -- Cond DRBSetup
   drb-Identity             DRB-Identity,
        <PARTLY OMITTED>
   pdcp-Config                PDCP-Config             OPTIONAL,     -- Cond PDCP
   ...
}
DRB-ToReleaseList ::=             SEQUENCE (SIZE (1..maxDRB)) OF DRB-Identity
DRB-Identity ::=            INTEGER (1..32)
SDAP-Config ::=           SEQUENCE {
        <PARTLY OMITTED>
    pdu-Session                 PDU-SessionID,
    mappedQoS-FlowsToAdd      SEQUENCE (SIZE (1..maxNrofQFIs)) OF QFI
    mappedQoS-FlowsToRelease     SEQUENCE (SIZE (1..maxNrofQFIs)) OF QFI
   ...
}
```

FIG. 7

```
     <OMITTED>
RadioResourceConfigDedicated ::=            SEQUENCE {
     <PARTLY OMITTED>
     srb-ToAddModList                       SRB-ToAddModList ,
     drb-ToAddModList                       DRB-ToAddModList,
     drb-ToReleaseList                      SEQUENCE (SIZE (1..maxDRB)) OF DRB-Identity,
     <PARTLY OMITTED>
}
SRB-ToAddModList ::= SEQUENCE (size (1..2)) OF SRB-ToAddMod
SRB-ToAddMod ::= SEQUENCE {
     <PARTLY OMITTED>
     srb-Identity          INTEGER (1..2),
     pdcp-Config           PDCP-Config                  OPTIONAL,
     <PARTLY OMITTED>
}
DRB-ToAddModList ::= SEQUENCE (size (1..maxQoSFlowID)) OF DRB-ToAddMod
DRB-ToAddMod ::= SEQUENCE {
     <PARTLY OMITTED>
     eps-BearerIdentity         INTEGER (0..15)         OPTIONAL,
     drb-Identity          DRB-Identity,
     pdcp-Config           PDCP-Config                  OPTIONAL,
     <PARTLY OMITTED>
}
DRB-Identity ::=                INTEGER (1..32)
     <OMITTED>
```

FIG. 8

```
SystemInformationBlockType20-r13 ::=  SEQUENCE {
    sc-mcch-RepetitionPeriod-r13      ENUMERATED {rf2, rf4, rf8, rf16, rf32, rf64, rf128, rf256},
    sc-mcch-Offset-r13                INTEGER (0..10),
    sc-mcch-FirstSubframe-r13         INTEGER (0..9),
    sc-mcch-duration-r13              INTEGER (2..9)    OPTIONAL,
    sc-mcch-ModificationPeriod-r13    ENUMERATED {rf2, rf4, rf8, rf16, rf32, rf64, rf128, rf256,
                                      rf512, rf1024, r2048, rf4096, rf8192, rf16384, rf32768,
                      rf65536},
    <OMITTED>
}
```

FIG. 10

```
SCPTMConfiguration-r13 ::=        SEQUENCE {
    sc-mtch-InfoList-r13           SC-MTCH-InfoList-r13,
    scptm-NeighbourCellList-r13      SCPTM-NeighbourCellList-r13        OPTIONAL,    -- Need OP
        <OMITTED>
}

SC-MTCH-InfoList-r13 ::=          SEQUENCE (SIZE (0..maxSC-MTCH-r13)) OF SC-MTCH-Info-r13

SC-MTCH-Info-r13 ::=              SEQUENCE    {
    mbmsSessionInfo-r13                    MBMSSessionInfo-r13,
    g-RNTI-r13                       BIT STRING(SIZE(16)),
    sc-mtch-schedulingInfo-r13          SC-MTCH-SchedulingInfo-r13       OPTIONAL,   -- Need OP
    sc-mtch-neighbourCell-r13           BIT STRING (SIZE(maxNeighCell-SCPTM-r13)) OPTIONAL,   -- Need OP
        <OMITTED>
}

MBMSSessionInfo-r13 ::=             SEQUENCE    {
    tmgi-r13                      TMGI-r9,
    sessionId-r13                    OCTET STRING (SIZE (1))     OPTIONAL    -- Need OR
}
```

FIG. 11

```
  <OMITTED>
MRB-ToAddModList ::=        SEQUENCE (SIZE (1..maxMRB)) OF MRB-ToAddMod
MRB-ToReleaseList ::=       SEQUENCE (SIZE (1..maxMRB)) OF MRB-ToAddMod
      <PARTLY OMITTED>
MRB-ToAddMod ::=          SEQUENCE {
   sdap-Config              SDAP-Config            OPTIONAL,
   mrb-Identity             MRB-Identity,
   pdcp-Config              PDCP-Config              OPTIONAL,    -- Cond PDCP
      <PARTLY OMITTED>
}
      <PARTLY OMITTED>
MRB-Identity ::=          INTEGER (1..32)
      <PARTLY OMITTED>
rlc-BearerToAddModList        SEQUENCE (SIZE(1..maxLCH)) OF RLC-Bearer-Config       OPTIONAL,
rlc-BearerToReleaseList       SEQUENCE (SIZE(1..maxLCH)) OF LogicalChannelIdentity  OPTIONAL,
      <PARTLY OMITTED>
RLC-Bearer-Config ::=   SEQUENCE {
   logicalChannelIdentity     LogicalChannelIdentity,
      <PARTLY OMITTED>
   mrb-Identity          MRB-Identity,
   rlc-Config            RLC-Config    OPTIONAL,
      <PARTLY OMITTED>
}
      <PARTLY OMITTED>
LogicalChannelIdentity ::=              INTEGER (1..maxLC-ID)
      <OMITTED>
```

FIG. 13

TERMINAL APPARATUS, BASE STATION APPARATUS, AND METHOD

TECHNICAL FIELD

The present invention relates to a terminal apparatus, a base station apparatus, and a method.

This application claims priority to JP 2021-92658 filed on Jun. 2, 2021, the contents of which are incorporated herein by reference.

BACKGROUND ART

In the 3rd Generation Partnership Project (3GPP) being a standardization project for cellular mobile communication systems, technical study and standardization have been carried out regarding the cellular mobile communication systems including radio access, core networks, services, and the like.

For example, in 3GPP, technical study and standardization have been started on Evolved Universal Terrestrial Radio Access (E-UTRA) as a Radio Access Technology (RAT) for cellular mobile communication systems for the 3.9th generation and the fourth generation. At present as well, in 3GPP, technical study and standardization have been carried out on enhanced technology of E-UTRA. Note that E-UTRA may also be referred to as Long Term Evolution (LTE (trade name)), and its enhanced technology may also be referred to as LTE-Advanced (LTE-A) and LTE-Advanced Pro (LTE-A Pro). (e.g., NPL 2)

In 3GPP, technical study and standardization have been started on New Radio (NR) or NR Radio access as a Radio Access Technology (RAT) for cellular mobile communication systems for the 5th generation (5G). At present as well, in 3GPP, technical study and standardization have been carried out on enhanced technology of NR. (e.g., NPL 1)

CITATION LIST

Non Patent Literature

NPL 1: 3GPP TS 38.300v 16.2.0, "NR; NR and NG-RAN Overall description; Stage 2" pp. 10-134

NPL 2: 3GPP TS 36.300 v16.2.0, "Evolved Universal Terrestrial Radio Access (E-UTRA) and Evolved Universal Terrestrial Radio Access Network (E-UTRAN); Overall description; Stage 2" pp. 19-361

SUMMARY OF INVENTION

Technical Problem

As one aspect of the study of the enhanced technology of Evolved Universal Terrestrial Radio Access (E-UTRA), in order to provide multicast/broadcast services, Multimedia Broadcast Multicast Service (MBMS) transmission technology has been standardized. For the MBMS transmission, transmission using a Multicast Broadcast Single Frequency Network (MBSFN) or a Single Cell Point-To-Multipoint (SC-PTM) is used.

In the transmission using the MBSFN, transmission of multicast/broadcast data is performed using a Physical Multicast Channel (PMCH) for each Multicast-Broadcast Single-Frequency Network (MBSFN) area including multiple cells. In contrast, in the transmission using the SC-PTM, transmission of multicast data is performed using a Physical Downlink Shared Channel (PDSCH) for each cell.

At the same time, multicast/broadcast services (Multicast Broadcast Services (MBS)) have been under study as the enhanced technology of NR. In a case that the MBS is performed via NR, technology specific to NR which is different from that of E-UTRA, a core network standardized for 5G, and the like need to be taken into consideration. However, studies have not yet been carried out on detailed operations for efficiently controlling the MBS by using NR.

An aspect of the present invention is made in view of the circumstances described above, and has an object to provide a terminal apparatus, a base station apparatus, and a method that enable efficient control of MBS by using NR.

Solution to Problem

In order to accomplish the object described above, an aspect of the present invention is contrived to provide the following means. Specifically, an aspect of the present invention is a terminal apparatus for communicating with a base station apparatus. The terminal apparatus includes: a receiver configured to receive an RRC reconfiguration message including a first parameter and/or a second parameter from the base station apparatus; and a processing unit. The processing unit performs first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

An aspect of the present invention is a base station apparatus for communicating with a terminal apparatus. The base station apparatus includes: a transmitter configured to transmit an RRC reconfiguration message including a first parameter and/or a second parameter to the terminal apparatus; and a processing unit. The processing unit causes the terminal apparatus to perform first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

An aspect of the present invention is a method for a terminal apparatus for communicating with a base station apparatus. The method includes: receiving an RRC reconfiguration message including a first parameter and/or a second parameter from the base station apparatus; and performing first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

An aspect of the present invention is a method for a base station apparatus for communicating with a terminal apparatus. The method includes: transmitting an RRC reconfiguration message including a first parameter and/or a second parameter to the terminal apparatus; and causing the terminal apparatus to perform first processing on each PDU session not to be added with the first parameter and/or the second parameter the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the base station apparatus, and the method can implement efficient MBS control using NR.

BRIEF DESCRIPTION OF DRAWINGS

FIG. 7 is an example of an ASN.1 notation included in a message related to reconfiguration of RRC connection in NR according to an embodiment of the present invention.

FIG. 8 is an example of an ASN.1 notation included in a message related to reconfiguration of RRC connection in E-UTRA according to an embodiment of the present invention.

FIG. 10 is a diagram illustrating an example of an ASN.1 notation representing fields and/or information elements included in a System Information Block Type 20 (SIB20).

FIG. 11 is a diagram illustrating an example of an ASN.1 notation representing fields and/or information elements included in an SC-PTM configuration message (SCPTMConfiguration).

FIG. 13 is a diagram illustrating an example of ASN.1 indicating parameters for establishing and/or configuring an MRB for delivery mode 1 according to an embodiment of the present invention.

DESCRIPTION OF EMBODIMENTS

Hereinafter, an embodiment of the present invention will be described in detail with reference to the drawings.

LTE (and LTE-A, LTE-A Pro) and NR may be defined as different Radio Access Technologies (RATs). NR may be defined as a technology included in LTE. LTE may be defined as a technology included in NR. LTE that is connectible to NR by using Multi Radio Dual connectivity (MR-DC) may be distinguished from existing LTE. LTE using a 5GC as a core network may be distinguished from existing LTE using an EPC as a core network. Note that existing LTE may refer to LTE in which a technology standardized in release 15 or later versions of 3GPP is not implemented. An embodiment of the present invention may be applied to NR, LTE, and other RATs. Terms associated with LTE and NR are used in the following description. However, an embodiment of the present invention may be applied to other technologies using other terms. In an embodiment of the present invention, the term "Evolved Universal Terrestrial Radio Access (E-UTRA)" may be replaced with "LTE," and the term "LTE" may be replaced with "E-UTRA."

Note that, in an embodiment of the present invention, terms of each node and entity, processing in each node and entity, and the like in a case that the radio access technology is E-UTRA or NR will be described. However, an embodiment of the present invention may be used for another radio access technology. The terms of each node and entity in an embodiment of the present invention may be other terms.

Figure 1:
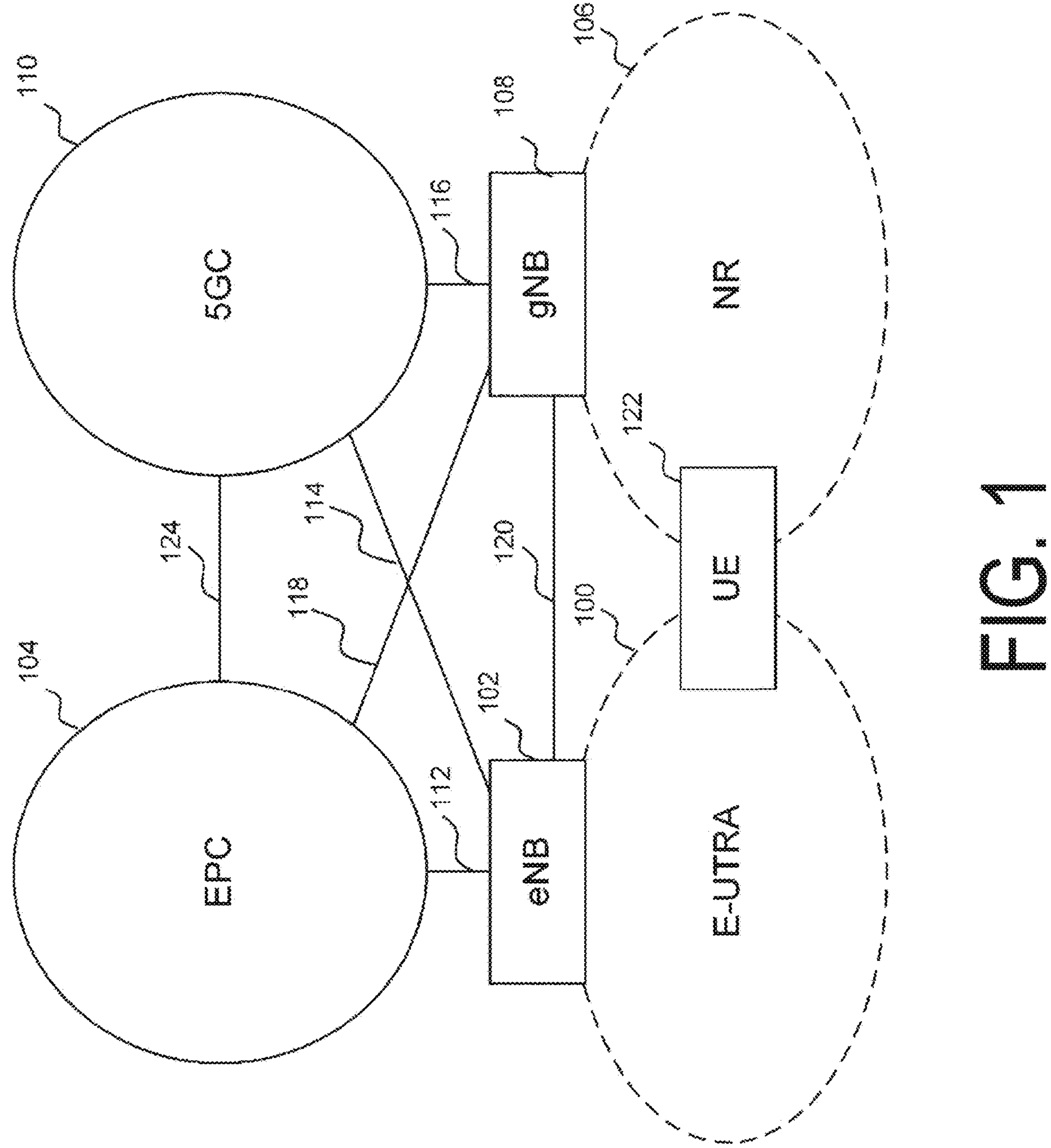
FIG. 1 is a schematic diagram of a communication system according to an embodiment of the present invention.

FIG. 1 is a schematic diagram of a communication system according to an embodiment of the present invention. Note that functions such as each node, radio access technology, core network, and interface to be described with reference to FIG. 1 are a part of functions closely related to an embodiment of the present invention, and other functions may be provided.

E-UTRA 100 may be a radio access technology. The E-UTRA 100 may be an air interface between a UE 122 and an eNB 102. The air interface between the UE 122 and the eNB 102 may be referred to as a Uu interface. The E-UTRAN Node B (eNB) 102 may be a base station apparatus of the E-UTRA 100. The eNB 102 may have an E-UTRA protocol to be described below. The E-UTRA protocol may include an E-UTRA User Plane (UP) protocol to be described below and an E-UTRA Control Plane (CP) protocol to be described below. The eNB 102 may terminate the E-UTRA User Plane (UP) protocol and the E-UTRA Control Plane (CP) protocol for the UE 122. A radio access network including the eNB may be referred to as an Evolved Universal Terrestrial Radio Access Network (E-UTRAN).

An Evolved Packet Core (EPC) 104 may be a core network. An interface 112 is an interface between the eNB 102 and the EPC 104, and may be referred to as an S1 interface. The interface 112 may include a control plane interface through which a control signal passes and/or a user plane interface through which user data passes. The control plane interface of the interface 112 may be terminated in a Mobility Management Entity (MME) (not illustrated) in the EPC 104. The user plane interface of the interface 112 may be terminated in a serving gateway (S-GW) (not illustrated) in the EPC 104. The control plane interface of the interface 112 may be referred to as an S1-MME interface. The user plane interface of the interface 112 may be referred to as an S1-U interface.

Note that one or multiple eNBs 102 may be connected to the EPC 104 via the interface 112. Among the multiple eNBs 102 connected to the EPC 104, an interface may be present (not illustrated). The interface among the multiple eNBs 102 connected to the EPC 104 may be referred to as an X2 interface.

NR 106 may be a radio access technology. The NR 106 may be an air interface between the UE 122 and a gNB 108. The air interface between the UE 122 and the gNB 108 may be referred to as a Uu interface. The g Node B (gNB) 108 may be a base station apparatus of the NR 106. The gNB 108 may have an NR protocol to be described below. The NR protocol may include an NR User Plane (UP) protocol to be described below and an NR Control Plane (CP) protocol to be described below. The gNB 108 may terminate the NR User Plane (UP) protocol and the NR Control Plane (CP) protocol for the UE 122.

A 5GC 110 may be a core network. An interface 116 is an interface between the gNB 108 and the 5GC 110, and may be referred to as an NG interface. The interface 116 may include a control plane interface through which a control signal passes and/or a user plane interface through which user data passes. The control plane interface of the interface 116 may be terminated in an Access and mobility Management Function (AMF) (not illustrated) in the 5GC 110. The user plane interface of the interface 116 may be terminated in a User Plane Function (UPF) (not illustrated) in the 5GC 110. The control plane interface of the interface 116 may be referred to as an NG-C interface. The user plane interface of the interface 116 may be referred to as an NG-U interface.

Note that one or multiple gNBs 108 may be connected to the 5GC 110 via the interface 116. Among the multiple gNBs 108 connected to the 5GC 110, an interface may be present (not illustrated). The interface among the multiple gNBs 108 connected to the 5GC 110 may be referred to as an Xn interface.

The eNB 102 may have a function of connecting to the 5GC 110. The eNB 102 having the function of connecting to the 5GC 110 may be referred to as an ng-eNB. An interface 114 is an interface between the eNB 102 and the 5GC 110, and may be referred to as an NG interface. The interface 114 may include a control plane interface through which a control signal passes and/or a user plane interface through which user data passes. The control plane interface of the interface 114 may be terminated in an Access and mobility Management Function (AMF) (not illustrated) in the 5GC 110. The user plane interface of the interface 114 may be terminated in a User Plane Function (UPF) (not illustrated) in the 5GC 110. The control plane interface of the interface 114 may be referred to as an NG-C interface. The user plane interface of the interface 114 may be referred to as an NG-U interface. A radio access network including the ng-eNB or the gNB may be referred to as a Next Generation-Radio Access Network (NG-RAN). The NG-RAN, the E-UTRAN, the eNB, the ng-eNB, the gNB, and the like may be simply referred to as a network.

Note that one or multiple eNBs 102 may be connected to the 5GC 110 via the interface 114. Among the multiple eNBs 102 connected to the 5GC 110, an interface may be present (not illustrated). The interface among the multiple eNBs 102 connected to the 5GC 110 may be referred to as an Xn interface. The eNB 102 connected to the 5GC 110 and the gNB 108 connected to the 5GC 110 may be connected with an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated in an S-GW (not illustrated) in the EPC 104. The user plane interface of the interface 118 may be referred to as an S1-U interface. The eNB 102 connected to the EPC 104 and the gNB 108 connected to the EPC 104 may be connected with the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface that allows only the CP, only the UP, or both of the CP and the UP to pass therethrough. A part or all of the interfaces out of the interface 114, the interface 116, the interface 118, the interface 120, the interface 124, and the like may be absent depending on a communication system provided by a communication provider or the like.

The UE 122 may be a terminal apparatus that can receive broadcast information and a paging message transmitted from the eNB 102 and/or the gNB 108. The UE 122 may be a terminal apparatus that can perform radio connection with the eNB 102 and/or the gNB 108. The UE 122 may be a terminal apparatus that can simultaneously perform radio connection with the eNB 102 and radio connection with the gNB 108. The UE 122 may have the E-UTRA protocol and/or the NR protocol. Note that the radio connection may be Radio Resource Control (RRC) connection.

In a case that the UE 122 communicates with the eNB 102 and/or the gNB 108, Radio Bearers (RBs) may be established between the UE 122 and the eNB 102 and/or the gNB 108 to perform radio connection. The radio bearer used for the CP may be referred to as a Signaling Radio Bearer (SRB). The radio bearer used for the UP may be referred to as a Data Radio Bearer (DRB). Each radio bearer may be assigned a radio bearer identity (Identity (ID)). The radio bearer identity for the SRB may be referred to as an SRB identity (SRB Identity or SRB ID). The radio bearer identity for the DRB may be referred to as a DRB identity (DRB Identity or DRB ID).

The UE 122 may be a terminal apparatus that can connect to the EPC 104 and/or the 5GC 110 via the eNB 102 and/or the gNB 108. In a case that a connection destination core network of the eNB 102 and/or the gNB 108 with which the UE 122 performs communication is the EPC 104, each DRB established between the UE 122 and the eNB 102 and/or the gNB 108 may further be uniquely associated with each Evolved Packet System (EPS) bearer passing through the EPC 104. Each EPS bearer may be identified with an EPS bearer identity (Identity or ID). The same QoS may be secured for data, such as an IP packet and an Ethernet (trade name) frame, which passes through the same EPS bearer.

In a case that the connection destination core network of the eNB 102 and/or the gNB 108 with which the UE 122 performs communication is the 5GC 110, each DRB established between the UE 122 and the eNB 102 and/or the gNB 108 may further be associated with one of Packet Data Unit (PDU) sessions established in the 5GC 110. Each PDU session may include one or multiple QoS flows. Each DRB may be associated with (mapped to) one or multiple QoS flows, or may be associated with none of the QoS flows. Each PDU session may be identified with a PDU session Identifier (Identity, or ID). Each QoS flow may be identified with a QoS flow Identifier Identity, or ID). The QoS may be secured for data, such as an IP packet and an Ethernet frame, which passes through the same QoS flow.

The EPC 104 may not include the PDU session(s) and/or the QoS flow(s). The 5GC 110 may not include the EPS bearer(s). In a case that the UE 122 is connected to the EPC 104, the UE 122 may have information of the EPS bearer(s) but may not have information in the PDU session(s) and/or the QoS flow(s). In a case that the UE 122 is connected to the 5GC 110, the UE 122 may have information in the PDU session(s) and/or the QoS flow(s) but may not have information of the EPS bearer(s).

Note that, in the following description, the eNB 102 and/or the gNB 108 is also simply referred to as a base station apparatus, and the UE 122 is also simply referred to as a terminal apparatus or a UE.

Figure 2:
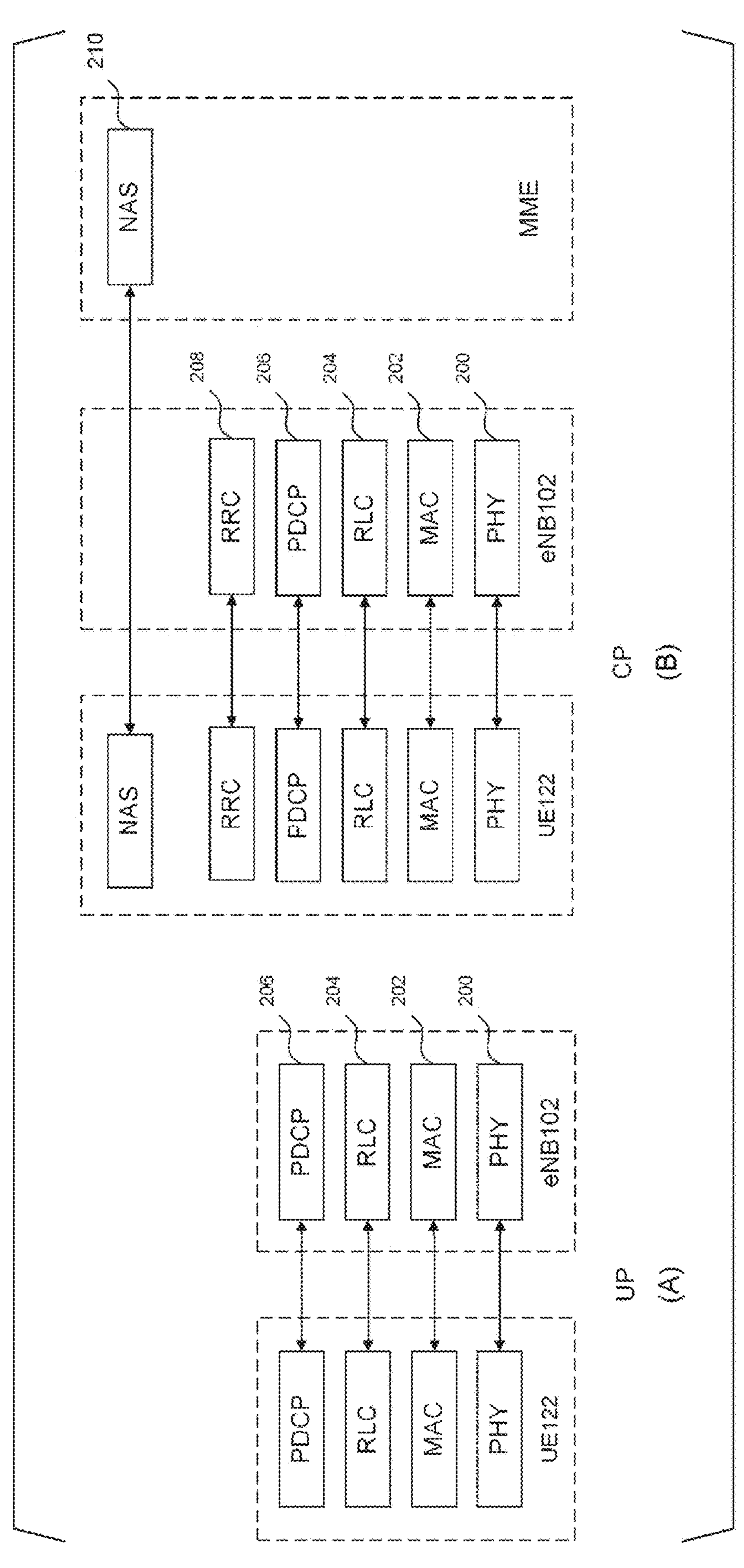
FIG. 2 is a diagram of an example of E-UTRA protocol architecture according to an embodiment of the present invention.
Figure 3:
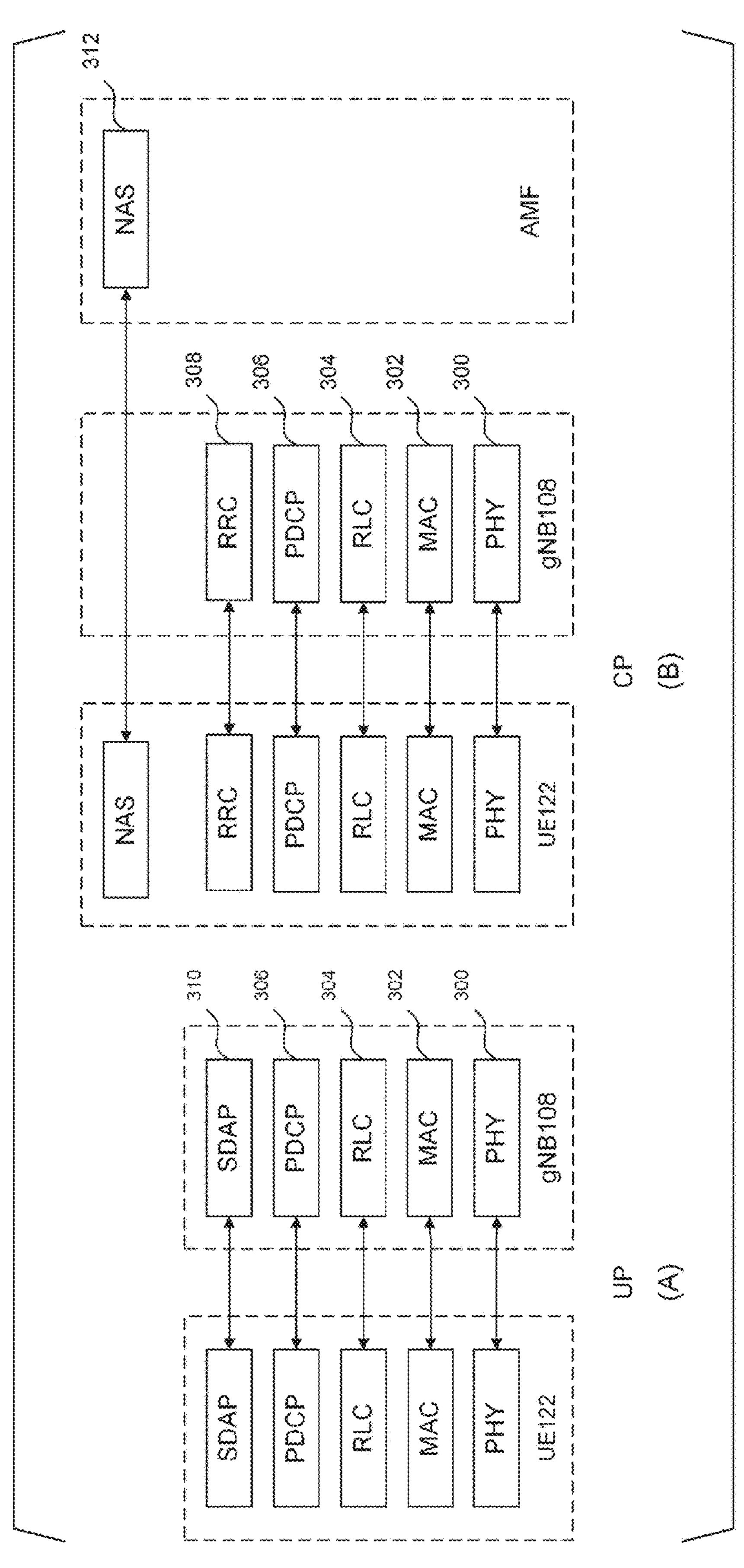
FIG. 3 is a diagram of an example of NR protocol architecture according to an embodiment of the present invention.

FIG. 2 is a diagram of an example of E-UTRA protocol architecture according to an embodiment of the present invention. FIG. 3 is a diagram of an example of NR protocol architecture according to an embodiment of the present invention. Note that functions of each protocol to be described with reference to FIG. 2 and/or FIG. 3 are a part of functions closely related to an embodiment of the present invention, and other functions may be provided. Note that, in an embodiment of the present invention, an uplink (UL) may be a link from the terminal apparatus to the base station apparatus. In each embodiment of the present invention, a downlink (DL) may be a link from the base station apparatus to the terminal apparatus.

FIG. 2(A) is a diagram of an E-UTRA user plane (UP) protocol stack. As illustrated in FIG. 2(A), the E-UTRAN UP protocol may be a protocol between the UE 122 and the eNB 102. In other words, the E-UTRAN UP protocol may be a protocol terminated in the eNB 102 in a network side. As illustrated in FIG. 2(A), the E-UTRA user plane protocol stack may include a Physical layer (PHY) 200 being a radio physical layer, a Medium Access Control (MAC) 202 being a medium access control layer, a Radio Link Control (RLC) 204 being a radio link control layer, and a Packet Data Convergence Protocol (PDCP) 206 being a packet data convergence protocol layer.

FIG. 3(A) is a diagram of an NR user plane (UP) protocol stack. As illustrated in FIG. 3(A), the NR UP protocol may be a protocol between the UE 122 and the gNB 108. In other words, the NR UP protocol may be a protocol terminated in the gNB 108 in a network side. As illustrated in FIG. 3(A), the E-UTRA user plane protocol stack may include a PHY 300 being a radio physical layer, a MAC 302 being a medium access control layer, an RLC 304 being a radio link control layer, a PDCP 306 being a packet data convergence protocol layer, and a service data adaptation protocol layer SDAP (Service Data Adaptation Protocol) 310.

FIG. 2(B) is a diagram of E-UTRA control plane (CP) protocol architecture. As illustrated in FIG. 2(B), in the E-UTRAN CP protocol, a Radio Resource Control (RRC) 208 being a radio resource control layer may be a protocol between the UE 122 and the eNB 102. In other words, the RRC 208 may be a protocol terminated in the eNB 102 in a network side. In the E-UTRAN CP protocol, a Non Access Stratum (NAS) 210 being a non Access Stratum (AS) layer (non AS layer) may be a protocol between the UE 122 and the MME. In other words, the NAS 210 may be a protocol terminated in the MME in a network side.

FIG. 3(B) is a diagram of NR control plane (CP) protocol architecture. As illustrated in FIG. 3(B), in the NR CP protocol, an RRC 308 being a radio resource control layer may be a protocol between the UE 122 and the gNB 108. In other words, the RRC 308 may be a protocol terminated in the gNB 108 in a network side. In the E-UTRAN CP protocol, a NAS 312 being a non AS layer may be a protocol between the UE 122 and the AMF. In other words, the NAS 312 may be a protocol terminated in the AMF in a network side.

Note that the Access Stratum (AS) layer may be a layer terminated between the UE 122 and the eNB 102 and/or the gNB 108. In other words, the AS layer may be a layer including a part or all of the PHY 200, the MAC 202, the RLC 204, the PDCP 206, and the RRC 208, and/or a layer including a part or all of the PHY 300, the MAC 302, the RLC 304, the PDCP 306, the SDAP 310, and the RRC 308.

Note that, in an embodiment of the present invention, terms such as a PHY (PHY layer), a MAC (MAC layer), an RLC (RLC layer), a PDCP (PDCP layer), an RRC (RRC layer), and a NAS (NAS layer) may be hereinafter used, without the protocol of E-UTRA and the protocol of NR being distinguished from each other. In this case, the PHY (PHY layer), the MAC (MAC layer), the RLC (RLC layer), the PDCP (PDCP layer), the RRC (RRC layer), and the NAS (NAS layer) may be the PHY (PHY layer), the MAC (MAC layer), the RLC (RLC layer), the PDCP (PDCP layer), the RRC (RRC layer), and the NAS (NAS layer) of the E-UTRA protocol, or may be the PHY (PHY layer), the MAC (MAC layer), the RLC (RLC layer), the PDCP (PDCP layer), the RRC (RRC layer), and the NAS (NAS layer) of the NR protocol, respectively. The SDAP (SDAP layer) may be the SDAP (SDAP layer) of the NR protocol.

In an embodiment of the present invention, in a case that the protocol of E-UTRA and the protocol of NR are distinguished from each other, the PHY 200, the MAC 202, the RLC 204, the PDCP 206, and the RRC 208 may be hereinafter referred to as the PHY for E-UTRA or the PHY for LTE, the MAC for E-UTRA or the MAC for LTE, the RLC for E-UTRA or the RLC for LTE, the PDCP for E-UTRA or the PDCP for LTE, and the RRC for E-UTRA or the RRC for LTE, respectively. The PHY 200, the MAC 202, the RLC 204, the PDCP 206, and the RRC 208 may be referred to as an E-UTRA PHY or an LTE PHY, an E-UTRA MAC or an LTE MAC, an E-UTRA RLC or an LTE RLC, an E-UTRA PDCP or an LTE PDCP, an E-UTRA RRC or an LTE RRC, and the like, respectively. In a case that the protocol of E-UTRA and the protocol of NR are distinguished from each other, the PHY 300, the MAC 302, the RLC 304, the PDCP 306, and the RRC 308 may be referred to as a PHY for NR, a MAC for NR, an RLC for NR, an RLC for NR, and an RRC for NR, respectively. The PHY 200, the MAC 302, the RLC 304, the PDCP 306, and the RRC 308 may be referred to as an NR PHY, an NR MAC, an NR RLC, an NR PDCP, an NR RRC, and the like, respectively.

Entities in the AS layer of E-UTRA and/or NR will be described. An entity having a part or all of functions of the MAC layer may be referred to as a MAC entity. An entity having a part or all of functions of the RLC layer may be referred to as an RLC entity. An entity having a part or all of functions of the PDCP layer may be referred to as a PDCP entity. An entity having a part or all of functions of the SDAP layer may be referred to as an SDAP entity. An entity having a part or all of functions of the RRC layer may be referred to as an RRC entity. The MAC entity, the RLC entity, the PDCP entity, the SDAP entity, and the RRC entity may be alternatively referred to as a MAC, an RLC, a PDCP, an SDAP, and an RRC, respectively.

Note that data provided from the MAC, the RLC, the PDCP, and the SDAP to a lower layer, and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. Data provided to the MAC, the RLC, the PDCP, and the SDAP from an upper layer, and/or data provided from the MAC, the RLC, the PDCP, and the SDAP to an upper layer may be referred to as a MAC Service Data Unit (SDU), an RLC SDU, a PDCP SDU, and an SDAP SDU, respectively. A segmented RLC SDU may be referred to as an RLC SDU segment.

An example of the functions of the PHY will be described. The PHY of the terminal apparatus may have a function of receiving data transmitted from the PHY of the base station apparatus via a Downlink (DL) Physical Channel. The PHY of the terminal apparatus may have a function of transmitting data to the PHY of the base station apparatus via an Uplink (UL) physical channel. The PHY may be connected to an upper MAC with a Transport Channel. The PHY may deliver data to the MAC via the transport channel. The PHY may be provided with data from the MAC via the transport channel. In the PHY, in order to identify various pieces of control information, a Radio Network Temporary Identifier (RNTI) may be used.

Now, the physical channels will be described.

The physical channels used for radio communication between the terminal apparatus and the base station apparatus may include the following physical channels.

Physical Broadcast CHannel (PBCH)

Physical Downlink Control CHannel (PDCCH)

Physical Downlink Shared CHannel (PDSCH)

Physical Uplink Control CHannel (PUCCH)

Physical Uplink Shared CHannel (PUSCH)

Physical Random Access CHannel (PRACH)

The PBCH may be used to broadcast system information required by the terminal apparatus.

The PBCH may be used to broadcast time indexes (SSB-Indexes) within the periodicity of synchronization signal blocks (also referred to as SS/PBCH blocks) in NR.

The PDCCH may be used to transmit (or carry) Downlink Control Information (DCI) in downlink radio communication (radio communication from the base station apparatus to the terminal apparatus). Here, one or multiple pieces of DCI (which may be referred to as DCI formats) may be defined for transmission of the downlink control information. In other words, a field for the downlink control information may be defined as DCI and may be mapped to information bits. The PDCCH may be transmitted in PDCCH candidates. The terminal apparatus may monitor a set of PDCCH candidates in a serving cell. To monitor a set of PDCCH candidates may mean an attempt to decode the PDCCH in accordance with a certain DCI format. The DCI format may be used for scheduling of the PUSCH in the serving cell. The PUSCH may be used for transmission of user data, transmission of RRC messages to be described below, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include a Scheduling Request (SR) used for requesting Uplink Shared CHannel (UL-SCH) resources. The uplink control information may include a Hybrid Automatic Repeat request ACKnowledgement (HARQ-ACK).

The PDSCH may be used to transmit downlink data (Downlink Shared CHannel (DL-SCH)) from the MAC layer. In a case of the downlink, the PDSCH may be used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used to transmit RRC signaling (also referred to as an RRC message) and a MAC control element. In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

An example of the functions of the MAC will be described. The MAC may be referred to as a MAC sublayer. The MAC may have a function of mapping various Logical Channels to their corresponding transport channels. The logical channel may be identified with a logical channel identifier (Logical Channel Identity or Logical Channel ID). The MAC may be connected to RLC being an upper layer with a logical channel. The logical channel may be classified into a control channel for transmitting control information and a traffic channel for transmitting user information, depending on a type of information to be transmitted. The logical channel may be classified into an uplink logical channel and a downlink logical channel. The MAC may have a function of multiplexing MAC SDUs belonging to one or multiple different logical channels and providing the multiplexed MAC SDUs to the PHY. The MAC may have a function of demultiplexing the MAC PDUs provided from the PHY and providing the demultiplexed MAC PDUs to an upper layer via the logical channels to which the respective MAC SDUs belong. The MAC may have a function of performing error correction through a Hybrid Automatic Repeat reQuest (HARQ). The MAC may have a Scheduling Report (SR) function of reporting scheduling information. The MAC may have a function of performing priority processing among the terminal apparatuses by using dynamic scheduling. The MAC may have a function of performing priority processing among the logical channels in one terminal apparatus. The MAC may have a function of performing priority processing of resources overlapping in one terminal apparatus. The E-UTRA MAC may have a function of identifying Multimedia Broadcast Multicast Services (MBMS). The NR MAC may have a function of identifying a Multicast Broadcast Service (MBS). The MAC may have a function of selecting a transport format. The MAC may have a function of performing Discontinuous Reception (DRX) and/or Discontinuous Transmission (DTX), a function of performing a Random Access (RA) procedure, a Power Headroom Report (PHR) function of reporting information of transmittable power, a Buffer Status Report (BSR) function of reporting data volume information of a transmission buffer, and the like. The NR MAC may have a Bandwidth Adaptation (BA) function. A MAC PDU format used in the E-UTRA MAC and a MAC PDU format used in the NR MAC may be different from each other. The MAC PDU may include a MAC control element (MAC CE) being an element for performing control in the MAC.

Uplink (UL) and/or Downlink (DL) logical channels used in E-UTRA and/or NR will be described.

A Broadcast Control Channel (BCCH) may be a downlink logical channel for broadcasting control information, such as System Information (SI).

A Paging Control Channel (PCCH) may be a downlink logical channel for carrying a Paging message.

A Common Control Channel (CCCH) may be a logical channel for transmitting control information between the terminal apparatus and the base station apparatus. The CCCH may be used in a case that the terminal apparatus does not have RRC connection. The CCCH may be used between the base station apparatus and multiple terminal apparatuses.

A Dedicated Control Channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has RRC connection.

A Dedicated Traffic Channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both of the uplink and the downlink.

A Multicast Traffic Channel (MTCH) may be a point-to-multipoint downlink channel for transmitting data from the base station apparatus to the terminal apparatus. The MTCH may be a logical channel for multicasting and/or broadcasting. The MTCH may be used by the terminal apparatus only in a case that the terminal apparatus receives MBMS.

A Multicast Control Channel (MCCH) may be a point-to-multipoint downlink channel for transmitting MBMS control information for one or multiple MTCHs from the base station apparatus to the terminal apparatus. The MCCH may be a logical channel for multicasting and/or broadcasting. The MCCH may be used by the terminal apparatus only in a case that the terminal apparatus receives MBMS or the terminal apparatus is interested in receiving MBMS.

A Single Cell Multicast Traffic Channel (SC-MTCH) may be a point-to-multipoint downlink channel for transmitting data by using SC-PTM from the base station apparatus to the terminal apparatus. The SC-MTCH may be a logical channel for multicasting and/or broadcasting. The SC-MTCH may be used by the terminal apparatus only in a case that the terminal apparatus receives MBMS by using Single Cell Point-To-Multipoint (SC-PTM).

A Single Cell Multicast Control Channel (SC-MCCH) may be a point-to-multipoint downlink channel for transmitting MBMS control information for one or multiple SC-MTCHs from the base station apparatus to the terminal apparatus. The SC-MCCH may be a logical channel for multicasting and/or broadcasting. The SC-MCCH may be used by the terminal apparatus only in a case that the terminal apparatus receives MBMS by using SC-PTM or the terminal apparatus is interested in receiving MBMS by using SC-PTM.

Mapping between the logical channels and the transport channels in uplink, in E-UTRA and/or NR will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the logical channels and the transport channels in downlink, in E-UTRA and/or NR will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

The MTCH may be mapped to a Multicast Channel (MCH) being a downlink transport channel.

The MCCH may be mapped to a Multicast Channel (MCH) being a downlink transport channel.

The SC-MTCH may be mapped to a Downlink Shared Channel (DL-SCH) being a downlink transport channel.

The SC-MTCH may be mapped to a Downlink Shared Channel (DL-SCH) being a downlink transport channel.

An example of the functions of the RLC will be described. The RLC may be referred to as an RLC sublayer. The E-UTRA RLC may have a function of segmenting (Segmentation) and/or concatenating (Concatenation) data provided from the PDCP being an upper layer, and providing the segmented and/or concatenated data to a lower layer. The E-UTRA RLC may have a function of reassembling (reassembly) and re-ordering data provided from a lower layer, and providing the reassembled and re-ordered data to an upper layer. The NR RLC may have a function of assigning data provided from the PDCP being an upper layer with a sequence number independent of a sequence number assigned in the PDCP. The NR RLC may have a function of segmenting (Segmentation) data provided from the PDCP, and providing the segmented data to a lower layer. The NR RLC may have a function of reassembling (reassembly) data provided from a lower layer, and providing the reassembled data to an upper layer. The RLC may have a data retransmission function and/or retransmission request function (Automatic Repeat reQuest (ARQ)). The RLC may have a function of performing error correction using the ARQ. Control information that indicates data required to be retransmitted and that is transmitted from a receiving side to a transmitting side of the RLC in order to perform the ARQ may be referred to as a status report. A status report transmission indication transmitted from the transmitting side to the receiving side of the RLC may be referred to as a poll. The RLC may have a function of detecting data duplication. The RLC may have a function of discarding data. The RLC may have three modes, namely a Transparent Mode (TM), an Unacknowledged Mode (UM), and an Acknowledged Mode (AM). In the TM, segmentation of data received from an upper layer may not be performed, and addition of an RLC header may not be performed. A TM RLC entity may be a uni-directional entity, and may be configured as a transmitting TM RLC entity or as a receiving TM RLC entity. In the UM, segmentation and/or concatenation of data received from an upper layer, addition of an RLC header, and the like may be performed, but retransmission control of data may not be performed. A UM RLC entity may be a uni-directional entity, or may be a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, the UM RRC entity may be configured as a UM RLC entity including a transmitting side and a receiving side. In the AM, segmentation and/or concatenation of data received from an upper layer, addition of an RLC header, retransmission control of data, and the like may be performed. An AM RLC entity may be a bi-directional entity, and may be configured as an AM RLC including a transmitting side and a receiving side. Note that data provided to a lower layer and/or data provided from a lower layer in the TM may be referred to as a TMD PDU. Data provided to a lower layer and/or data provided from a lower layer in the UM may be referred to as a UMD PDU. Data provided to a lower layer or data provided from a lower layer in the AM may be referred to as an AMD PDU. An RLC PDU format used in the E-UTRA RLC and an RLC PDU format used in the NR RLC may be different from each other. The RLC PDU may include an RLC PDU for data and an RLC PDU for control. The RLC PDU for data may be referred to as an RLC DATA PDU (RLC Data PDU, RLC data PDU). The RLC PDU for control may be referred to as an RLC CONTROL PDU (RLC Control PDU, RLC control PDU).

An example of state variables used in the RLC entity will be described. In the RLC entity, a part or all of the state variables including the state variables of the following (A) to (K) may be used:

(A) A response state variable used on the transmitting side of the AM RLC entity. This indicates a value of the sequence number of the RLC SDU with which a positive response is to be received next. This may be a state variable referred to as TX_Next_Ack;

(B) A transmission state variable used on the transmitting side of the AM RLC entity. This indicates a value of the sequence number to be assigned to the AMD PDU to be newly created next. This may be a state variable referred to as TX_Next;

(C) A poll state variable used on the transmitting side of the AM RLC entity. This indicates the highest value of the sequence number among the AMD PDUs to be submitted to a lower layer in a case that the state variable is set. This may be a state variable referred to as POLL_SN;

(D) A reception state variable used on the receiving side of the AM RLC entity. This indicates a value to follow the sequence number of the RLC SDU that has been successfully received in order. This may be a state variable referred to as RX_Next;

(E) A reassembly timer state variable used on the receiving side of the AM RLC entity. This indicates a value of the sequence number next to the sequence number of the AMD PDU with which a reassembly timer has been started. This may be a state variable referred to as RX_Next_Status Trigger;

(F) A highest STATUS transmission state variable used on the receiving side of the AM RLC entity. This indicates a value of the sequence number of the AMD PDU reported as the AMD PDU that has been successfully received in a case that a status PDU needs to be created. This may be a state variable referred to as RX_Highest_Status;

(G) A highest reception state variable used on the receiving side of the AM RLC entity. This indicates a value of the sequence number next to the highest value of the sequence number among the received AMD PDUs. This may be a state variable referred to as RX_Next_Highest;

(H) A transmission state variable used on the transmitting side of the UM RLC entity. This indicates a value of the sequence number to be assigned in a case that the UMD PDU to be newly created next is segmented. This may be a state variable referred to as TX_Next;

(I) A UM reception state variable used on the receiving side of the UM RLC entity. This indicates the lowest value among the sequence numbers of the UMD PDU that may possibly be reassembled. This may be a state variable referred to as RX_Next_Reassembly;

(J) A UM reassembly timer state variable used on the receiving side of the UM RLC entity. This indicates a value of the sequence number next to the sequence number of the UMD PDU with which a reassembly timer has been started. This may be a state variable referred to as RX_Timer_Trigger;

(K) A UM reception state variable used on the receiving side of the UM RLC entity. This indicates a value of the sequence number next to the highest value of the sequence number among the received UMD PDUs. This may be a state variable referred to as RX_Next_Highest.

An example of counters used in the RLC entity will be described. In the RLC entity, counters including a part or all of the counters of the following (A) to (C) may be used:

(A) A counter that counts the number of AMD PDUs transmitted after transmission of the last poll bit. This may be a counter referred to as PDU_WITHOUT_POLL;

(B) A counter that counts the number of bytes of data transmitted after transmission of the last poll bit. This may be a counter referred to as BYTE_WITHOUT_POLL;

(C) A counter that counts the number of times the RLC SDU or the RLC SDU segment is retransmitted. This may be a counter referred to as RETX_COUNT.

An example of timers used in the RLC entity will be described. In the RLC entity, counters including a part or all of the timers of the following (A) to (C) may be used:

(A) A timer for retransmitting a poll used on the transmitting side of the AM RLC entity. This may be a timer referred to as t-PollRetransmit;

(B) A timer for detecting loss of the RLC PDU used on the receiving side of the AM RLC entity and the receiving UM RLC entity. This may be a timer referred to as t-Reassembly;

(C) A timer for prohibiting transmission of the status PDU used on the receiving side of the AM RLC entity. This may be a timer referred to as t-StatusProhibit.

An example of the functions of the PDCP will be described. The PDCP may be referred to as a PDCP sublayer. The PDCP may have a function of maintenance of the sequence number. The PDCP may have a header compression and decompression function for efficiently transmitting, in wireless sections, user data such as an IP Packet and an Ethernet frame. A protocol used for header compression and decompression for an IP packet may be referred to as a Robust Header Compression (ROHC) protocol. A protocol used for header compression and decompression for an Ethernet frame may be referred to as an Ethernet (trade name) Header Compression (EHC) protocol. The PDCP may have a function of encryption and decryption of data. The PDCP may have a function of integrity protection and integrity verification of data. The function of encryption and decryption of data and/or the function of integrity protection and integrity verification of data may be alternatively referred to as a security function. The PDCP may have a function of re-ordering. The PDCP may have a function of retransmitting the PDCP SDU. The PDCP may have a function of discarding data using a discard timer. The PDCP may have a Duplication function. The PDCP may have a function of discarding pieces of data received in a duplicate manner. The PDCP entity may be a bi-directional entity, and may include a transmitting PDCP entity and a receiving PDCP entity. A PDCP PDU format used in the E-UTRA PDCP and a PDCP PDU format used in the NR PDCP may be different from each other. The PDCP PDU may include a PDCP PDU for data and a PDCP PDU for control. The PDCP PDU for data may be referred to as a PDCP DATA PDU (PDCP Data PDU, PDCP data PDU). The PDCP PDU for control may be referred to as a PDCP CONTROL PDU (PDCP Control PDU, PDCP control PDU).

In the PDCP, in a case of performing processing of ciphering or integrity protection, a COUNT value may be used. The COUNT value may include a Hyper Frame Number (HFN) being a state variable of the PDCP, and a Sequence Number (SN) added to the header of the PDCP PDU. The sequence number may be incremented by 1 every time the PDCP DATA PDU is generated in a transmitting PDCP entity. The HFN may be incremented by 1 every time the sequence number reaches a maximum value in the transmitting PDCP entity and a receiving PDCP entity. In order to manage the COUNT value in the transmitting PDCP entity and the receiving PDCP entity, a part or all of the following state variables of (A) to (F) may be used:

(A) a state variable indicating the COUNT value of the PDCP SDU to be transmitted next. The state variable may be a state variable referred to as TX_NEXT;

(B) a state variable indicating the sequence number of the PDCP SDU to be transmitted next, in the PDCP entity. The state variable may be a state variable referred to as Next_PDCP_TX_SN;

(C) a state variable indicating an HFN value used for generating the COUNT value of the PDCP PDU in the PDCP entity. The state variable may be a state variable referred to as TX_HFN;

(D) a state variable indicating the COUNT value of the PDCP SDU expected to be received next in the receiving PDCP entity. The state variable may be a state variable referred to as RX_NEXT;

(E) a state variable indicating the sequence number of the PDCP SDU expected to be received next in the receiving PDCP entity. The state variable may be a state variable referred to as Next_PDCP_RX_SN;

(F) a state variable indicating an HFN value used for generating the COUNT value for a received PDCP PDU in the PDCP entity. The state variable may be a state variable referred to as RX_HFN;

Note that, in LTE and NR, prohibition is imposed on use of the same COUNT value twice or more for the same security key (encryption key and/or integrity protection key) for each of data in an uplink direction and data in a downlink direction in each radio bearer for the purpose of replay protection and the like.

In the PDCP, re-ordering may be processing for storing the PDCP SDUs in a receive buffer (re-ordering buffer) and delivering the PDCP SDUs to an upper layer according to the order of the COUNT values obtained from header information of the PDCP DATA PDUs. In re-ordering. in a case that the COUNT value of the PDCP Data PDU received is the COUNT value of a first PDCP SDU not delivered to the upper layer yet, processing for delivering the stored PDCP SDUs to the upper layer according to the order of COUNT values may be performed. In other words, in a case that the PDCP data PDUs having the COUNT values smaller than the COUNT values of the received PDCP data PDUs have not yet been successfully received (PDCP data PDUs are lost), the processing may be performed in which the received PDCP data PDUs are converted into the PDCP SDUs, the PDCP SDUs are stored in the re-ordering buffer, all of the lost PDCP data PDUs are received and converted into the PDCP SDUs, and then the PDCP SDUs are delivered to the upper layer. In re-ordering, in order to detect loss of the PDCP data PDUs, a re-ordering timer (a timer referred to as t-Reordering) may be used. For re-ordering, a part or all of the following state variables of (A) to (F) may be used:

(A) a state variable indicating the COUNT value of the PDCP SDU expected to be received next in the receiving PDCP entity. The state variable may be a state variable referred to as RX_NEXT;

(B) a state variable indicating the sequence number of the PDCP SDU expected to be received next in the receiving PDCP entity. The state variable may be a state variable referred to as Next_PDCP_RX_SN;

(C) a state variable indicating an HFN value used for generating the COUNT value for a received PDCP PDU in the PDCP entity. The state variable may be a state variable referred to as RX_HFN;

(D) a state variable indicating the COUNT value of a first PDCP PDU out of PDCP SDUs that are to be received and have not been delivered to an upper layer in the receiving PDCP entity. The state variable may be a state variable referred to as RX_DELIV;

(E) a state variable indicating the sequence number of the PDCP PDU out of the PDCP SDUs that were last delivered to an upper layer in the receiving PDCP entity. The state variable may be a state variable referred to as Last_Submitted_PDCP_RX_SN;

(F) a state variable indicating a COUNT value next to the COUNT value of the PDCP PDU that caused the re-ordering timer to start in the receiving PDCP entity. The state variable may be a state variable referred to as RX_REORD, or may be a state variable referred to as Reordering_PDCP_RX_COUNT.

Status Reporting in the PDCP will be described. In a DRB (Acknowledged Mode Data Radio Bearer (AM DRB)) using RLC of an Acknowledged Mode in which transmission of a PDCP status report is configured by an upper layer, the receiving PDCP entity may trigger the PDCP status report in a case that one condition of the following (A) to (D) is satisfied. In a DRB (Unacknowledged Mode Data Radio Bearer (UM DRB)) using RLC of an Unacknowledged Mode in which transmission of a PDCP status report is configured by an upper layer, the receiving PDCP entity may trigger the PDCP status report in a case that the condition of the following (C) is satisfied. (A) to (D) are as follows:

(A) the upper layer requests re-establishment of the PDCP entity;

(B) the upper layer requests PDCP data recovery;

(C) the upper layer requests uplink data switching;

(D) the upper layer reconfigures the PDCP entity in order to release a Dual Active Protocol Stack (DAPS), and a parameter referred to as daps source release is configured.

In a case that transmission of the PDCP status report is triggered, the receiving PDCP entity may perform creation of the PDCP status report. The creation of the PDCP status report may be performed by storing, in the PDCP control PDU for the PDCP status report, information of the PDCP SDUs to be received including the COUNT value of the first PDCP PDU out of the PDCP SDUs that are to be received and have not been delivered to the upper layer. The receiving PDCP entity that has created the PDCP status report may submit the created PDCP status report to a lower layer via the transmitting PDCP entity.

Note that, in an embodiment of the present invention, the PDCP entity of the UM DRB in which transmission of the PDCP status report is configured by the upper layer may determine that PDCP data recovery has been requested from the upper layer. The PDCP entity of the UM DRB that has determined that PDCP data recovery has been requested from the upper layer may create the PDCP status report in the receiving PDCP entity, based on that the PDCP data recovery has been requested from the upper layer, and submit the created PDCP status report to a lower layer via the transmitting PDCP entity. Note that the lower layer may be a UM RLC entity of an RLC bearer associated with the PDCP entity. Note that, in an embodiment of the present invention, only in a case that the UM DRB is not a DAPS bearer, the PDCP entity of the UM DRB in which transmission of the PDCP status report is configured by the upper layer may determine that PDCP data recovery has been requested from the upper layer. The DAPS bearer may be a bearer in which one or multiple RLC entities for a source cell and one or multiple RLC entities for a target cell are associated with the PDCP entity. As the PDCP data recovery, another term indicating that the upper layer requests the PDCP to transmit the status report may be used.

The ROHC will be described. In an embodiment of the present invention, the ROHC may be referred to as an ROHC protocol. The ROHC may have a function of compressing header information, such as an IP, a UDP, a TCP, and an RTP, and a function of decompressing the header information. In the ROHC, a compressor may have a header compression function of compressing the header information. In the ROHC, a decompressor may have a header decompression function of decompressing the header information. The compressor may perform header compression by using a context stored in the compressor. The decompressor may perform header decompression by using a context stored in the decompressor. In an embodiment of the present invention, the context may be referred to as an ROHC context. The context in the decompressor may be generated by receiving all of the pieces of header information from the compressor. The context in the compressor and the decompressor may be stored for each IP flow. In order to identify the context, a Context Identifier (CID) may be used. Information of a maximum value of the context identifier, information of a profile indicating a method of header compression and decompression, and the like may be negotiated between the compressor and the decompressor before the header compression and decompression is performed.

In the ROHC, the header information may be classified into static parts and dynamic parts. The static parts of the header information in the ROHC may be information that hardly changes out of the header information of each packet belonging to the IP flow. The static parts of the header information in the ROHC may be, for example, information including a source address, a destination address, and a version in an IPv4 header and an IPv6 header, a source port and a destination port in a UDP header and a TCP header, and the like. The dynamic parts of the header information in the ROHC may be information that may change for each packet out of the header information of each packet belonging to the IP flow. The dynamic parts of the header information in the ROHC may be, for example, information including a traffic class and a hop limit in the IPv6 header, Type of service and Time to Live in the IPv4 header, a checksum in the UDP header, an RTP sequence number and an RTP timestamp in the RTP header, and the like.

The compressor of the ROHC may have three states, i.e., an Initialization and Refresh (IR) state, a First Order (FO) state, and a Second Order (SO) state. In a case that the IR state is used, the compressor may transmit all of the pieces of header information to the decompressor, without compressing pieces of header information to be compressed. In a case that the FO state is used, the compressor may perform transmission to the decompressor, by compressing a most part of the static parts and without compressing a part of the static parts and the dynamic parts, out of the pieces of header information to be compressed. In a case that the SO state is used, a compression rate of the header is the highest, and the compressor may only transmit limited information, such as the RTP sequence number.

The decompressor of the ROHC may have three states, i.e., a No Context (NC) state, a Static Context (SC) state, and a Full Context (FC) state. An initial state of the decompressor may be the NC state. In a case that the context is acquired in the NC state, and the state then transitions to a state in which header decompression is performed correctly, the state may transition to the FC state. In a case that header decompression continuously fails in the FC state, the state may transition to the SC state or the NC state.

Processing modes of the ROHC may have three modes, i.e., a Unidirectional mode (U-mode), a Bidirectional Optimistic mode (O-mode), and a Bidirectional Reliable mode (R-mode). In the U-mode, an ROHC feedback packet need not be used. In the U-mode, transition from a low compression mode to a high compression mode, i.e., transition from the IR state to the FO state, and/or transition from the FO state to the SO state, and/or transition from the IR state to the SO state in the compressor may be performed by transmitting a certain number of packets. In the U-mode, transition from a high compression mode to a low compression mode, i.e., transition from the SO state to the FO state, and/or transition from the FO state to the IR state, and/or transition from the SO state to the IR state in the compressor may be performed periodically, such that information necessary for header decompression may be periodically transmitted to the decompressor. In the O-mode, the decompressor may transmit an ROHC feedback packet to the compressor, and thereby perform a context update request to the compressor. In the R-mode, the compressor may receive a header decompression succeed notification on an ROHC feedback packet from the decompressor, and thereby transition from a low compression mode to a high compression mode. In the R-mode, the compressor may receive a context update request on an ROHC feedback packet from the decompressor, and thereby transition from a high compression mode to a low compression mode. The processing mode of the ROHC may start with the U-mode. Transition of the processing mode of the ROHC may be determined by the decompressor. The decompressor may prompt the compressor to transition the processing mode by using an ROHC feedback packet.

An example of the functions of the SDAP will be described. The SDAP is a service data adaptation protocol layer. The SDAP may have a function of performing association (mapping) between a downlink QoS flow transmitted from the 5GC 110 to the terminal apparatus via the base station apparatus and a data radio bearer (DRB) and/or mapping between an uplink QoS flow transmitted from the terminal apparatus to the 5GC 110 via the base station apparatus and a DRB. The SDAP may have a function of storing mapping rule information. The SDAP may have a function of performing marking of a QoS flow identifier (QoS Flow ID (QFI)). Note that the SDAP PDU may include an SDAP PDU for data and an SDAP PDU for control. The SDAP PDU for data may be referred to as an SDAP DATA PDU (SDAP Data PDU, SDAP data PDU). The SDAP PDU for control may be referred to as an SDAP CONTROL PDU (SDAP Control PDU, SDAP control PDU). Note that, in the terminal apparatus, one SDAP entity may be present for one PDU session.

An example of the functions of the RRC will be described. The RRC may have a broadcast function. The RRC may have a Paging function from the EPC 104 and/or the 5GC 110. The RRC may have a Paging function from the gNB 108 or the eNB 102 connected to the 5GC 100. The RRC may have an RRC connection management function. The RRC may have a radio bearer control function. The RRC may have a cell group control function. The RRC may have a mobility control function. The RRC may have a terminal apparatus measurement reporting and terminal apparatus measurement reporting control function. The RRC may have a QoS management function. The RRC may have a radio link failure detection and recovery function. With use of an RRC message, the RRC may perform broadcast, paging, RRC connection management, radio bearer control, cell group control, mobility control, terminal apparatus measurement reporting and terminal apparatus measurement reporting control, QoS management, radio link failure detection and recovery, and the like. Note that RRC messages and parameters used in the E-UTRA RRC may be different from RRC messages and parameters used in the NR RRC.

The RRC message may be transmitted using the BCCH of the logical channel, may be transmitted using the PCCH of the logical channel, may be transmitted using the CCCH of the logical channel, may be transmitted using the DCCH of the logical channel, or may be transmitted using the MCCH of the logical channel.

In the RRC message transmitted using the BCCH, for example, a Master Information Block (MIB) may be included, a System Information Block (SIB) of each type may be included, or another RRC message may be included. In the RRC message transmitted using the PCCH, for example, a paging message may be included, or another RRC message may be included.

In the RRC message transmitted in the uplink (UL) direction using the CCCH, for example, an RRC setup request message (RRC Setup Request), an RRC resume request message (RRC Resume Request), an RRC reestablishment request message (RRC Reestablishment Request), an RRC system information request message (RRC System Info Request), and the like may be included. For example, an RRC connection request message (RRC Connection Request), an RRC connection resume request message (RRC Connection Resume Request), an RRC connection reestablishment request message (RRC Connection Reestablishment Request), and the like may be included. Another RRC message may be included.

In the RRC message transmitted in the downlink (DL) direction using the CCCH, for example, an RRC connection reject message (RRC Connection Reject), an RRC connection setup message (RRC Connection Setup), an RRC connection reestablishment message (RRC Connection Reestablishment), an RRC connection reestablishment reject message (RRC Connection Reestablishment Reject), and the like may be included. For example, an RRC reject message (RRC Reject), an RRC setup message (RRC Setup), an RRC resume message (RRC Resume), and the like may be included. Another RRC message may be included.

In the RRC message transmitted in the uplink (UL) direction using the DCCH, for example, a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), a security mode complete message (Security Mode Complete), a UE capability information message (UE Capability Information), and the like may be included. For example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resume complete message (RRC Resume Complete), a security mode complete message (Security Mode Complete), a UE capability information message (UE Capability Information), a counter check response message (Counter Check Response), and the like may be included. Another RRC message may be included.

In the RRC message transmitted in the downlink (DL) direction using the DCCH, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like may be included. For example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), a counter check message (Counter Check), and the like may be included. Another RRC message may be included.

An example of the functions of the NAS will be described. The NAS may have an authentication function.

The NAS may have a function of performing mobility management. The NAS may have a function of security control.

The functions of the PHY, the MAC, the RLC, the PDCP, the SDAP, the RRC, and the NAS described above are merely an example, and a part or all of each of the functions may not be implemented. Some or all of the functions of each layer may be included in another layer.

Note that, in upper layers (not illustrated) of the AS layer of the terminal apparatus, an IP layer, and a Transmission Control Protocol (TCP) layer and a User Datagram Protocol (UDP) layer, which are upper layers of the IP layer, and the like may be present. In the upper layers of the AS layer of the terminal apparatus, an Ethernet layer may be present. This may be referred to as a PDU layer being an upper layer of the AS layer of the terminal apparatus. The PDU layer may include the IP layer, the TCP layer, the UDP layer, the Ethernet layer, and the like. In the upper layers of the IP layer, the TCP layer, the UDP layer, the Ethernet layer, and the PDU layer, an application layer may be present. The application layer may include a Session Initiation Protocol (SIP) and a Session Description Protocol (SDP) used in an IP Multimedia Subsystem (IMS) being one of service networks standardized in 3GPP. The application layer may include protocols, such as a Real-time Transport Protocol (RTP) used for media communication and/or Real-time Transport Control Protocol (RTCP) for media communication control, and/or a HyperText Transfer Protocol (HTTP). The application layer may include a codec for various media and the like. The RRC layer may be an upper layer of the SDAP layer.

The state transition of the UE 122 in LTE and NR will now be described. Regarding the UE 122 connected to the EPC or the 5GC, the UE 122 may be in an RRC_CONNECTED state in a case that an RRC connection has been established. The state in which the RRC connection has been established may include a state in which the UE 122 retains a part or all of UE contexts to be described below. The state in which the RRC connection has been established may include a state in which the UE 122 can transmit and/or receive unicast data. Regarding the UE 122, in a case that the RRC connection is suspended, the UE 122 may be in an RRC_INACTIVE state. The case that the UE 122 is in the RRC_INACTIVE state may be a case that the UE 122 is connected to the 5GC and the RRC connection is suspended. In a case that the UE 122 is in neither the RRC_CONNECTED state nor the RRC_INACTIVE state, the UE 122 may be in an RRC_IDLE state.

Note that, in a case that the UE 122 is connected to the EPC, suspension of the RRC connection may be initiated by the E-UTRAN although the UE 122 does not have the RRC_INACTIVE state. In a case that the UE 122 is connected to the EPC and the RRC connection is suspended, the UE 122 may transition to the RRC_IDLE state while retaining an AS context of the UE and an identifier (resume Identity) used for resumption (resume). In a case that the UE 122 retains the AS context of the UE and that the E-UTRAN permits the RRC connection to be resumed and that the UE 122 needs to transition from the RRC_IDLE state to the RRC_CONNECTED state, an upper layer (for example, the NAS layer) of the RRC layer of the UE 122 may initiate the resumption of the RRC connection suspended.

The definition of the suspension may vary between the UE 122 connected to the EPC 104 and the UE 122 connected to the 5GC 110. All or a part of the procedures for the UE 122 to resume from suspension may be different between a case that the UE 122 is connected to the EPC (is suspended in the RRC_IDLE state) and a case that the UE 122 is connected to the 5GC (is suspended in the RRC_INACTIVE state).

Note that the RRC_CONNECTED state, the RRC_INACTIVE state, and the RRC_IDLE state may be respectively referred to as a connected state (connected mode), an inactive state (inactive mode), and an idle state (idle mode), or may be respectively referred to as an RRC connected state (RRC connected mode), an RRC inactive state (RRC inactive mode), and an RRC idle state (RRC idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cell Identity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

The Cell Group configured for the terminal apparatus from the base station apparatus will be described. The cell group may include one Special Cell (SpCell). The cell group may include one SpCell and one or multiple Secondary Cells (SCells). In other words, the cell group may include one SpCell, and optionally one or multiple SCells. Note that, in a case that the MAC entity is associated with a Master Cell Group (MCG), the SpCell may mean a Primary Cell (PCell). In a case that the MAC entity is associated with a Secondary Cell Group (SCG), the SpCell may mean a Primary SCG Cell (PSCell). In a case that the MAC entity is not associated with the cell group, the SpCell may mean the PCell. Each of the PCell, the PSCell, and the SCell is a serving cell. The SpCell may support PUCCH transmission and contention-based Random Access, and the SpCell may be constantly activated. The PCell may be a cell used for an RRC connection establishment procedure in a case that the terminal apparatus in the RRC idle state transitions to the RRC connected state. The PCell may be a cell used for an RRC connection reestablishment procedure in which the terminal apparatus performs reestablishment of RRC connection. The PCell may be a cell used for a random access procedure in a case of a handover. The PSCell may be a cell used for the random access procedure in a case of addition of a Secondary Node (SN) to be described below. The SpCell may be a cell used for purposes other than the purposes described above. Note that, in a case that the cell group includes the SpCell and one or more SCells, it can be said that carrier aggregation (CA) is configured for the cell group. For the terminal apparatus configured with CA, a cell that provides additional radio resources to the SpCell may mean the SCell.

A group of serving cells configured by the RRC, which is a cell group using the same timing reference cell and the same timing advance value for cells out of the group configured with the uplink may be referred to as a Timing Advance Group (TAG). The TAG including the SpCell of the MAC entity may mean a Primary Timing Advance Group (PTAG). The TAG other than the PTAG may mean a Secondary Timing Advance Group (STAG).

In a case that Dual Connectivity (DC) and Multi-Radio Dual Connectivity (MR-DC) are performed, addition of a cell group for the terminal apparatus from the base station apparatus may be performed. DC may be a technology for performing data communication by using radio resources of the cell groups configured by each of a first base station apparatus (first node) and a second base station apparatus (second node). MR-DC may be a technology included in DC. In order to perform DC, the first base station apparatus may add the second base station apparatus. The first base station apparatus may be referred to as a Master Node (MN). The cell group configured by the master node may be referred to as a Master Cell Group (MCG). The second base station apparatus may be referred to as a Secondary Node (SN). The cell group configured by the secondary node may be referred to as a Secondary Cell Group (SCG). Note that the master node and the secondary node may be configured in the same base station apparatus.

In a case that DC is not configured, the cell group configured for the terminal apparatus may be referred to as an MCG. In the case that DC is not configured, the SpCell configured for the terminal apparatus may be the PCell.

Note that MR-DC may be a technology for performing DC using E-UTRA for the MCG and NR for the SCG. MR-DC may be a technology for performing DC using NR for the MCG and E-UTRA for the SCG. MR-DC may be a technology for performing DC using NR for both of the MCG and the SCG. As an example of MR-DC using E-UTRA for the MCG and NR for the SCG, there may be E-UTRA-NR Dual Connectivity (EN-DC) using the EPC as a core network, or there may be NG-RAN E-UTRA-NR Dual Connectivity (NGEN-DC) using the 5GC as a core network. As an example of MR-DC using NR for the MCG and E-UTRA for the SCG, there may be NR-E-UTRA Dual Connectivity (NE-DC) using the 5GC as a core network. As an example of MR-DC using NR for both of the MCG and the SCG, there may be NR-NR Dual Connectivity (NR-DC) using the 5GC as a core network.

Note that, in the terminal apparatus, one MAC entity may be present for each cell group. For example, in a case that DC or MR-DC is configured for the terminal apparatus, one MAC entity may be present for the MCG, and one MAC entity may be present for the SCG. The MAC entity for the MCG in the terminal apparatus may be constantly established for the terminal apparatus in all of the states (the RRC idle state, the RRC connected state, the RRC inactive state, and the like). The MAC entity for the SCG in the terminal apparatus may be created by the terminal apparatus in a case that the SCG is configured for the terminal apparatus. Configuration of the MAC entity for each cell group of the terminal apparatus may be performed in a case that the terminal apparatus receives an RRC message from the base station apparatus. In EN-DC and NGEN-DC, the MAC entity for the MCG may be an E-UTRA MAC entity, and the MAC entity for the SCG may be an NR MAC entity. In NE-DC, the MAC entity for the MCG may be an NR MAC entity, and the MAC entity for the SCG may be an E-UTRA MAC entity. In NR-DC, each of the MAC entities for the MCG and the SCG may be an NR MAC entity. Note that a case that one MAC entity is present for each cell group may be alternatively described as a case that one MAC entity is present for each SpCell. One MAC entity for each cell group may be alternatively referred to as one MAC entity for each SpCell.

The radio bearers will be described. For the SRBs of E-UTRA, SRB0 to SRB2 may be defined, or SRBs other than these may be defined. For the SRBs of NR, SRB0 to SRB3 may be defined, or SRBs other than these may be defined. SRB0 may be an SRB for an RRC message transmitted and/or received using the CCCH of the logical channel. SRB1 may be an SRB for an RRC message, and for a NAS message before establishment of SRB2. The RRC message transmitted and/or received using SRB1 may include a piggybacked NAS message. For all of RRC messages and NAS messages transmitted and/or received using SRB1, the DCCH of the logical channel may be used. SRB2 may be an SRB for a NAS message, and for an RRC message including logged measurement information. For all of RRC messages and NAS messages transmitted and/or received using SRB2, the DCCH of the logical channel may be used. SRB2 may have a priority lower than that of SRB1. SRB3 may be an SRB for transmitting and/or receiving a specific RRC message in a case that EN-DC, NGEN-DC, NR-DC, or the like is configured for the terminal apparatus. For all of RRC messages and NAS messages transmitted and/or received using SRB3, the DCCH of the logical channel may be used. Other SRBs may be provided for other purposes. The DRB may be a radio bearer for user data. For an RRC message transmitted and/or received using the DRB, the DTCH of the logical channel may be used.

The radio bearers in the terminal apparatus will be described. The radio bearers include an RLC bearer. The RLC bearer may include one or two RLC entities and a logical channel. The RLC entities in a case that the RLC bearer includes two RLC entities may be the transmitting RLC entity and the receiving RLC entity in the TM RLC entity and/or the uni-directional UM mode RLC entity. SRB0 may include one RLC bearer. The RLC bearer of SRB0 may include the RLC entity of TM, and a logical channel. SRB0 may be constantly established in the terminal apparatus in all of the states (the RRC idle state, the RRC connected state, the RRC inactive state, and the like). In a case that the terminal apparatus transitions from the RRC idle state to the RRC connected state, one SRB1 may be established and/or configured for the terminal apparatus, using an RRC message received from the base station apparatus. SRB1 may include one PDCP entity, and one or multiple RLC bearers. The RLC bearer of SRB1 may include the RLC entity of AM, and a logical channel. One SRB2 may be established and/or configured for the terminal apparatus, using an RRC message that the terminal apparatus in the RRC connected state with activated AS security receives from the base station apparatus. SRB2 may include one PDCP entity, and one or multiple RLC bearers. The RLC bearer of SRB2 may include the RLC entity of AM, and a logical channel. Note that the PDCP of SRB1 and SRB2 on the base station apparatus side may be deployed in the master node. In a case that the secondary node in EN-DC, NGEN-DC, or NR-DC is added or in a case that the secondary node is changed, one SRB3 may be established and/or configured for the terminal apparatus, using an RRC message that the terminal apparatus in the RRC connected state with activated AS security receives from the base station apparatus. SRB3 may be a direct SRB between the terminal apparatus and the secondary node. SRB3 may include one PDCP entity, and one or multiple RLC bearers. The RLC bearer of SRB3 may include the RLC entity of AM, and a logical channel. The PDCP of the SRB3 on the base station apparatus side may be deployed in the secondary node. One or multiple DRBs may be established and/or configured for the terminal apparatus, using an RRC message that the terminal apparatus in the RRC connected state with activated AS security receives from the base station apparatus. The DRB may include one PDCP entity, and one or multiple RLC bearers. The RLC bearer of the DRB may include the RLC entity of AM or UM, and a logical channel.

Note that, in MR-DC, the radio bearer whose PDCP is deployed in the master node may be referred to as an MN terminated bearer. In MR-DC, the radio bearer whose PDCP is deployed in the secondary node may be referred to as an SN terminated bearer. Note that, in MR-DC, the radio bearer whose RLC bearer is present only in the MCG may be referred to as an MCG bearer. In MR-DC, the radio bearer whose RLC bearer is present only in the SCG may be referred to as an SCG bearer. In DC, the radio bearer whose RLC bearer is present in both of the MCG and the SCG may be referred to as a split bearer.

In a case that MR-DC is configured for the terminal apparatus, a bearer type of SRB1 and SRB2 established/and or configured for the terminal apparatus may be an MN terminated MCG bearer and/or an MN terminated split bearer. In a case that MR-DC is configured for the terminal apparatus, a bearer type of SRB3 established/and or configured for the terminal apparatus may be an SN terminated SCG bearer. In a case that MR-DC is configured for the terminal apparatus, a bearer type of the DRB established/and or configured for the terminal apparatus may be any one of all of the bearer types.

The RLC entity established and/or configured for the RLC bearer established and/or configured for the cell group configured in E-UTRA may be the E-UTRA RLC. The RLC entity established and/or configured for the RLC bearer established and/or configured for the cell group configured in NR may be the NR RLC. In a case that EN-DC is configured for the terminal apparatus, the PDCP entity established and/or configured for the MN terminated MCG bearer may be either the E-UTRA PDCP or the NR PDCP. In a case that EN-DC is configured for the terminal apparatus, the PDCP established and/or configured for the radio bearers of other bearer types, i.e., an MN terminated split bearer, an MN terminated SCG bearer, an SN terminated MCG bearer, an SN terminated split bearer, and an SN terminated SCG bearer, may be the NR PDCP. In a case that NGEN-DC, NE-DC, or NR-DC is configured for the terminal apparatus, the PDCP entity established and/or configured for the radio bearers of all of the bearer types may be the NR PDCP.

Note that, in NR, the DRB established and/or configured for the terminal apparatus may be associated with one PDU session. One SDAP entity may be established and/or configured for one PDU session in the terminal apparatus. The SDAP entity, the PDCP entity, the RLC entity, and the logical channel established and/or configured for the terminal apparatus may be established and/or configured using an RRC message that the terminal apparatus receives from the base station apparatus.

Note that, regardless of whether or not MR-DC is configured, a network configuration in which the master node is the eNB 102 and the EPC 104 is used as a core network may be referred to as E-UTRA/EPC. A network configuration in which the master node is the eNB 102 and the 5GC 110 is used as a core network may be referred to as E-UTRA/5GC. A network configuration in which the master node is the gNB 108 and the 5GC 110 is used as a core network may be referred to as NR or NR/5GC. In a case that MR-DC is not configured, the master node described above may refer to the base station apparatus that performs communication with the terminal apparatus.

Next, the handover in LTE and NR will be described. The handover may be processing in which the UE 122 in the RRC connected state changes the serving cell. The handover may be performed in a case that the UE 122 receives an RRC message indicating handover from the eNB 102 and/or the gNB 108. The RRC message indicating handover may be a message related to reconfiguration of RRC connection including a parameter indicating handover (for example, an information element referred to as MobilityControlInfo, or an information element referred to as ReconfigurationWithSync). Note that the information element referred to as MobilityControlInfo described above may be alternatively referred to as a mobility control configuration information element, a mobility control configuration, or mobility control information. Note that the information element referred to as ReconfigurationWithSync described above may be alternatively referred to as a reconfiguration with synchronization information element, or a reconfiguration with synchronization. Alternatively, the RRC message indicating handover may be a message (for example, MobilityFromEUTRACommand, or MobilityFromNRCommand) indicating movement to a cell of another RAT. The handover may be alternatively referred to as a reconfiguration with synchronization (reconfiguration withsync). As a condition that the UE 122 can perform handover, a case that a part or all of a case that AS security is activated, a case that the SRB2 has been established, included may be that at least one DRB has been established.

Figure 4:
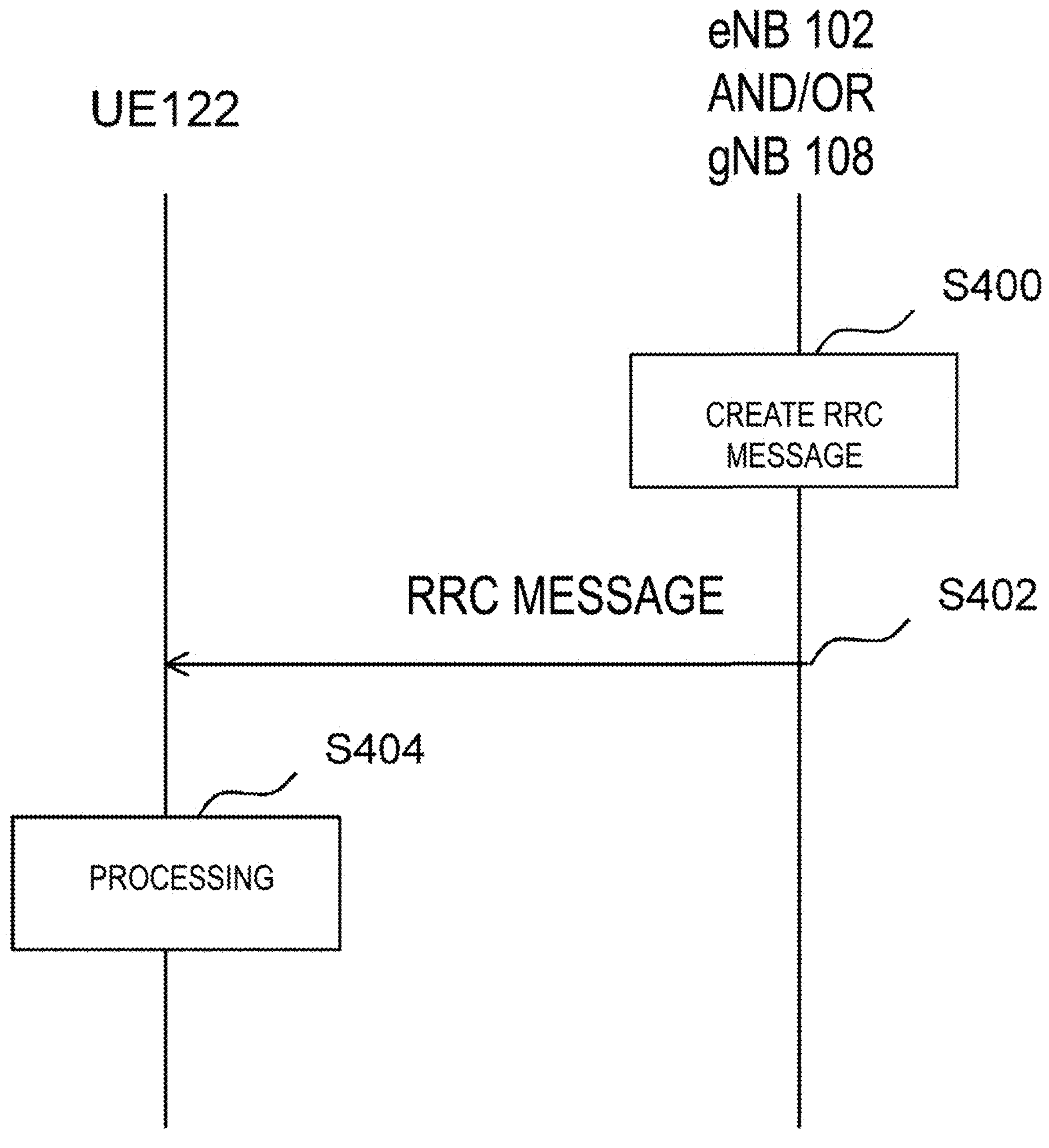
FIG. 4 is a diagram illustrating an example of a flow of a procedure for various configurations in RRC according to an embodiment of the present invention.

A flow of the RRC message transmitted and/or received between the terminal apparatus and the base station apparatus will be described. FIG. 4 is a diagram illustrating an example of a flow of a procedure for various configurations in the RRC according to an embodiment of the present invention. FIG. 4 is an example of a flow of a case that the RRC message is transmitted from the base station apparatus (eNB 102 and/or gNB 108) to the terminal apparatus (UE 122).

In FIG. 4, the base station apparatus creates an RRC message (Step S400). The creation of the RRC message in the base station apparatus may be performed so that the base station apparatus distributes broadcast information (System Information (SI)) and paging information. The creation of the RRC message in the base station apparatus may be performed so that the base station apparatus causes a specific terminal apparatus to perform processing. The processing that the specific terminal apparatus is caused to perform may include, for example, processing such as configuration related to security, reconfiguration of RRC connection, handover to a different RAT, suspension of RRC connection, and release of RRC connection. The processing of reconfiguration of RRC connection may include, for example, processing such as control (establishment, change, release, or the like) of a radio bearer, control (establishment, addition, change, release, or the like) of a cell group, measurement configuration, handover, and security key update. The creation of the RRC message in the base station apparatus may be performed for a response to an RRC message transmitted from the terminal apparatus. The response to the RRC message transmitted from the terminal apparatus may include, for example, a response to an RRC setup request, a response to an RRC reconnection request, a response to an RRC resume request, and the like. The RRC message includes parameters for various information notifications and configurations. These parameters may be referred to as fields and/or information elements, and may be notated by using a notation method referred to as Abstract Syntax Notation One (ASN.1). Note that, in an embodiment of the present invention, a parameter may be referred to as information.

In FIG. 4, the base station apparatus then transmits the RRC message created, to the terminal apparatus (Step S402). Then, in a case that processing such as a configuration is necessary in accordance with the RRC message received, the terminal apparatus performs the processing (Step S404). The terminal apparatus that has performed the processing may transmit an RRC message for a response to the base station apparatus (not illustrated).

In addition to the example described above, the RRC message may be used for other purposes as well.

Note that, in MR-DC, the RRC on the master node side may be used for transfer of the RRC message for the configuration (cell group configuration, radio bearer configuration, measurement configuration, and the like) on the SCG side to and from the terminal apparatus. For example, in EN-DC or NGEN-DC, the RRC message of E-UTRA transmitted and/or received between the eNB 102 and the UE 122 may include the RRC message of NR in a form of a container. In NE-DC, the RRC message of NR transmitted and/or received between the gNB 108 and the UE 122 may include the RRC message of E-UTRA in a form of a container. The RRC message for the configuration on the SCG side may be transmitted and/or received between the master node and the secondary node.

Note that an embodiment is not limited to a case that MR-DC is used, and the RRC message for E-UTRA transmitted from the eNB 102 to the UE 122 may include the RRC message for NR, and the RRC message for NR transmitted from the gNB 108 to the UE 122 may include the RRC message for E-UTRA.

An example of the parameters included in the RRC message related to reconfiguration of RRC connection will be described. FIG. 7 is an example of an ASN.1 notation representing a field and/or an information element related to a radio bearer configuration included in a message related to reconfiguration of RRC connection in NR in FIG. 4. FIG. 8 is an example of an ASN.1 notation representing a field and/or an information element related to a radio bearer configuration included in a message related to reconfiguration of RRC connection in E-UTRA in FIG. 4. Not only in the figures of FIG. 7 and FIG. 8, but also in examples of the ASN.1 according to an embodiment of the present invention, <omitted> and <partly omitted> are not a part of the notation of the ASN.1 and indicate that other information is omitted at these positions. Note that there may also be omitted information elements in a part where neither <omitted> nor <partly omitted> is indicated. Note that, in an embodiment of the present invention, the examples of the ASN.1 do not correctly comply with the ASN.1 notation method. In an embodiment of the present invention, the examples of the ASN.1 are notations of examples of parameters of the RRC message according to an embodiment of the present invention, and other terms and other notations may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, fields, information elements, and the like included in the RRC message and notated in ASN.1 may be referred to as information, or may be referred to as parameters. Note that the message related to reconfiguration of RRC connection may be an RRC reconfiguration message in NR or an RRC connection reconfiguration message in E-UTRA. Note that, in the examples of ASN.1 according to an embodiment of the present invention, description will be given by mainly taking information elements as an example; however, the present description may be description for fields corresponding to the information elements. In the examples of ASN.1 according to an embodiment of the present invention, in a case that description is given by taking fields as an example, the present description may be description for information elements corresponding to the fields.

An information element represented by RadioBearerConfig in FIG. 7 may be an information element used for configuration, modification, release, and the like of a radio bearer such as an SRB and a DRB. The information element represented by RadioBearerConfig may include a PDCP configuration information element and an SDAP configuration information element to be described later. The information element represented by RadioBearerConfig may be referred to as a radio bearer configuration information element or a radio bearer configuration. An information element represented by SRB-ToAddMod included in the information element represented by RadioBearerConfig may be an information element indicating a signalling radio bearer (SRB) configuration. The information element represented by SRB-ToAddMod may be referred to as an SRB configuration information element or an SRB configuration. An information element represented by SRB-ToAddModList may be a list of SRB configurations. An information element represented by DRB-ToAddMod included in the information element represented by RadioBearerConfig may be an information element indicating a data radio bearer (DRB) configuration. The information element represented by DRB-ToAddMod may be referred to as a DRB configuration information element or a DRB configuration. An information element represented by DRB-ToAddModList may be a list of DRB configurations. The list of DRB configurations may be alternatively referred to as a DRB configuration list information element or a DRB configuration list parameter. Note that each of the SRB configuration and the DRB configuration may be referred to as a radio bearer configuration.

A field represented by srb-Identity in the SRB configuration information element may be information of an SRB Identity of an SRB to be added or modified, and may be an identity for uniquely identifying the SRB in each terminal apparatus. The field represented by srb-Identity in the SRB configuration information element may be referred to as an SRB identity field or an SRB identity. The SRB identity may be referred to as a radio bearer identity.

A field represented by drb-Identity in the DRB configuration information element may be information of a DRB Identity of a DRB to be added or modified, and may be an identity for uniquely identifying the DRB in each terminal apparatus. The field represented by drb-Identity in the DRB configuration information element may be referred to as a DRB identity field or a DRB identity. In the example of FIG. 7, a value of the DRB identity is an integer value from 1 to 32, but may be another value. In a case of DC, the DRB identity may be specific within a scope of the UE 122. The DRB identity may be referred to as a radio bearer identity.

A field represented by cnAssociation in the DRB configuration information element may be a field indicating whether the radio bearer is associated with a field represented by eps-bearerIdentity to be described later, or is associated with an information element represented by SDAP-Config to be described later. The field represented by cnAssociation may be referred to as a core network association field or a core network association. The field represented by cnAssociation may include an EPS bearer identity field (eps-bearerIdentity) to be described later in a case that the terminal apparatus is connected to the EPC 104. The field represented by cnAssociation may include an information element (SDAP-Config) indicating an SDAP configuration to be described later in a case that the terminal apparatus is connected to the core network 5GC 110. The field represented by eps-bearerIdentity may be a field indicating an EPS bearer identity for identifying an EPS bearer. The field represented by eps-bearerIdentity may be referred to as an EPS bearer identity field or an EPS bearer identity.

The information element represented by SDAP-Config may be information related to a configuration or a reconfiguration of the SDAP entity. The information element represented by SDAP-Config may be referred to as an SDAP configuration information element or an SDAP configuration.

A field represented by pdu-session included in the SDAP configuration information element may be a PDU session identifier of a PDU session to which a QoS flow mapped to the radio bearer belongs. The field represented by pdu-session may be referred to as a PDU session identifier field or a PDU session identifier. The PDU session identifier may be a PDU session identifier of a PDU session. The radio bearer may be a DRB associated with a DRB identity of a DRB configuration including the SDAP configuration field.

A field represented by mappedQoS-FlowsToAdd included in the SDAP configuration information element may be information indicating a list of QoS flow identity (QoSFlow Identity (QFI)) fields of an uplink QoS flow to be additionally mapped to the radio bearer. The field represented by mappedQoS-FlowsToAdd may be referred to as a QoS flow field to be added or a QoS flow to be added. The QoS flow may be a QoS flow of a PDU session indicated by a PDU session included in the SDAP configuration information element. The radio bearer may be a DRB associated with a DRB identity of a DRB configuration including the SDAP configuration field.

A field represented by mappedQoS-FlowsToRelease included in the SDAP configuration information element may be information indicating a list of QoS flow identity information elements of a QoS flow whose correspondence is to be released out of QoS flows mapped to the radio bearer. The field represented by mappedQoS-FlowsToRelease may be referred to as a QoS flow field to be released or a QoS flow to be released. The QoS flow may be a QoS flow of a PDU session indicated by a PDU session included in the SDAP configuration information element. The radio bearer may be a DRB associated with a DRB identity of a DRB configuration including the SDAP configuration field.

In addition to the above, the SDAP configuration information element may include a field indicating whether or not an uplink SDAP header is present in uplink data to be transmitted via the radio bearer, a field indicating whether or not a downlink SDAP header is present in downlink data to be received via the radio bearer, a field indicating whether or not the radio bearer is a default radio bearer (default DRB), and the like. The radio bearer may be a DRB associated with a DRB identity of a DRB configuration including the SDAP configuration field.

An information element represented by PDCP-Config in the SRB configuration information element and the DRB configuration information element may be an information element related to a configuration of an NR PDCP entity. The information element represented by PDCP-Config may be referred to as a PDCP configuration information element or a PDCP configuration. The information element related to the configuration of the NR PDCP entity may include a field indicating an uplink sequence number size, a field indicating a downlink sequence number size, a field indicating a profile of header compression (RObust Header Compression (ROHC)), a field indicating a value of the re-ordering timer, and the like.

An information element represented by DRB-ToReleaseList included in the information element represented by RadioBearerConfig may include information indicating one or more DRB identities to be released.

In FIG. 8, an information element represented by RadioResourceConfigDedicated may be an information element used for configuration, modification, release, and the like of a radio bearer. An information element represented by SRB-ToAddMod included in the information element represented by RadioResourceConfigDedicated may be information indicating a signalling radio bearer (SRB) configuration. The information element represented by SRB-ToAddMod may be referred to as an SRB configuration information element or an SRB configuration. An information element represented by SRB-ToAddModList may be a list of pieces of information indicating the SRB configuration. An information element represented by DRB-ToAddMod included in the information element represented by RadioResourceConfigDedicated may be information indicating a data radio bearer (DRB) configuration. The information element represented by DRB-ToAddMod may be referred to as a DRB configuration information element or a DRB configuration. The information element represented by DRB-ToAddModList may be a list of pieces of information indicating the DRB configuration. Note that one or all of the SRB configuration and the DRB configuration may be referred to as a radio bearer configuration.

A field represented by srb-Identity in the SRB configuration information element may be information of an SRB Identity of an SRB to be added or modified, and may be an identity for uniquely identifying the SRB in each terminal apparatus. The field represented by srb-Identity in the SRB configuration information element may be referred to as an SRB identity field or an SRB identity. The SRB identity may be referred to as a radio bearer identity. The SRB identity of FIG. 8 may have the same function as the SRB identity of FIG. 7.

A field represented by drb-Identity in the DRB configuration may be information of a DRB Identity of a DRB to be added or modified, and may be an identity for uniquely identifying the DRB in each terminal apparatus. The field represented by drb-Identity in the DRB configuration information element may be referred to as a DRB identity field or a DRB identity. In the example of FIG. 8, a value of the DRB identity is an integer value from 1 to 32, but may be another value. The DRB identity may be referred to as a radio bearer identity. The DRB identity of FIG. 8 may have the same function as the DRB identity of FIG. 7.

A field represented by eps-BearerIdentity in the DRB configuration information element may be an EPS bearer identity for uniquely identifying the EPS bearer in each terminal apparatus. The field represented by eps-BearerIdentity may be referred to as an EPS bearer identity field or an EPS bearer identity. In the example of FIG. 8, a value of the EPS bearer identity is an integer value from 1 to 15, but may be another value. The EPS bearer identity of FIG. 8 may have the same function as the EPS bearer identity of FIG. 7.

The EPS bearer identity and the DRB identity may correspond to each other on a one-to-one basis in each terminal apparatus.

An information element represented by PDCP-Config in the SRB configuration information element and the DRB configuration information element may be an information element related to a configuration of an E-UTRA PDCP entity. The information element represented by PDCP-Config may be referred to as a PDCP configuration information element or a PDCP configuration. The information element related to the configuration of the E-UTRA PDCP entity may include a field indicating a sequence number size, a field indicating a profile of header compression (RObust Header Compression (ROHC)), a field indicating a value of the re-ordering timer, and the like.

The SRB configuration information element illustrated in FIG. 8 may further include a field related to an E-UTRA RLC entity configuration (not illustrated). The field related to the E-UTRA RLC entity configuration may be referred to as an RLC configuration field or an RLC configuration. The SRB configuration information element illustrated in FIG. 8 may include an information element related to a logical channel configuration (not illustrated). The information element related to the logical channel configuration may be referred to as a logical channel configuration information element or a logical channel configuration.

The DRB configuration information element illustrated in FIG. 8 may further include an information element related to an E-UTRA RLC entity configuration (not illustrated). The information element related to the E-UTRA RLC entity configuration may be referred to as an RLC configuration information element or an RLC configuration. The DRB configuration information element illustrated in FIG. 8 may include a field indicating logical channel identity (ID) information. The field indicating the logical channel identity (ID) information may be referred to as a logical channel identity field or a logical channel identity. The DRB configuration information element illustrated in FIG. 8 may include an information element related to a logical channel configuration (not illustrated). The information element related to the logical channel configuration may be referred to as a logical channel configuration information element or a logical channel configuration. Note that the logical channel identity may be associated with the radio bearer identity.

An information element represented by DRB-ToReleaseList included in the information element represented by RadioResourceConfigDedicated may include information indicating one or more DRB identities to be released.

Note that, in NR, information elements related to an RLC bearer configuration, such as an information element related to an NR RLC entity configuration for each radio bearer, an information element indicating logical channel identity (ID) information, and an information element related to a logical channel configuration, may be included not in the information element represented by RadioBearerConfig of FIG. 7 but in an information element related to a cell group configuration (not illustrated). The information element related to the cell group configuration may be included in a message related to a reconfiguration of RRC connection. The information element related to the cell group configuration may be referred to as a cell group configuration information element or a cell group configuration. The information element related to the NR RLC entity configuration may be referred to as an RLC configuration information element or an RLC configuration. The information element indicating the logical channel identity information may be referred to as a logical channel identity information element or a logical channel identity. The information element related to the logical channel configuration may be referred to as a logical channel configuration information element or a logical channel identity. Note that the logical channel identity may be associated with the radio bearer identity.

A part or all of the fields and the information elements described with reference to FIG. 7 or FIG. 8 may be optional. In other words, the fields and the information elements described with reference to FIG. 7 or FIG. 8 may be included in a message related to a reconfiguration of RRC connection, as necessary or depending on a condition. The message related to the reconfiguration of RRC connection may include a field indicating application of a full configuration and the like, in addition to the information element related to a configuration of a radio bearer. The field indicating application of the full configuration may be represented by an information element name of fullConfig or the like, or application of the full configuration may be indicated using true, enable, or the like.

Based on the description in the above, various embodiments of the present invention will be described. Note that the processing described in the above may be applied to each processing not described in the following.

Figure 5:
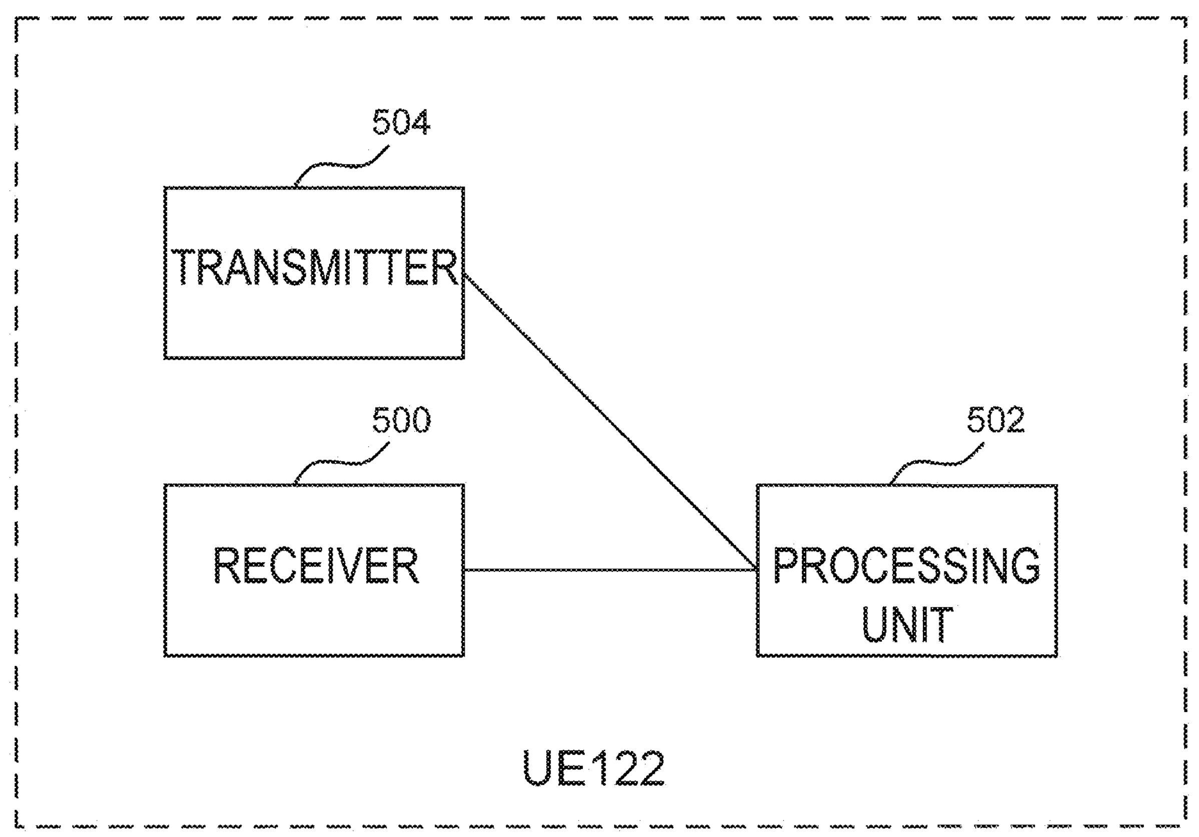
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to an aspect of the present invention in order to avoid complexity of description.

The UE 122 illustrated in FIG. 5 includes a receiver 500 that receives an RRC message and the like from the base station apparatus, a processing unit 502 that performs processing in accordance with parameters included in a received message, and a transmitter 504 that transmits an RRC message and the like to the base station apparatus. The base station apparatus may be the eNB 102, or may be the gNB 108. The processing unit 502 may include a part or all of functions of various layers (for example, the physical layer, the MAC layer, the RLC layer, the PDCP layer, the SDAP layer, the RRC layer, and the NAS layer). In other words, the processing unit 502 may include a part or all of a physical layer processing unit, a MAC layer processing unit, an RLC layer processing unit, a PDCP layer processing unit, an SDAP processing unit, an RRC layer processing unit, and a NAS layer processing unit.

Figure 6:
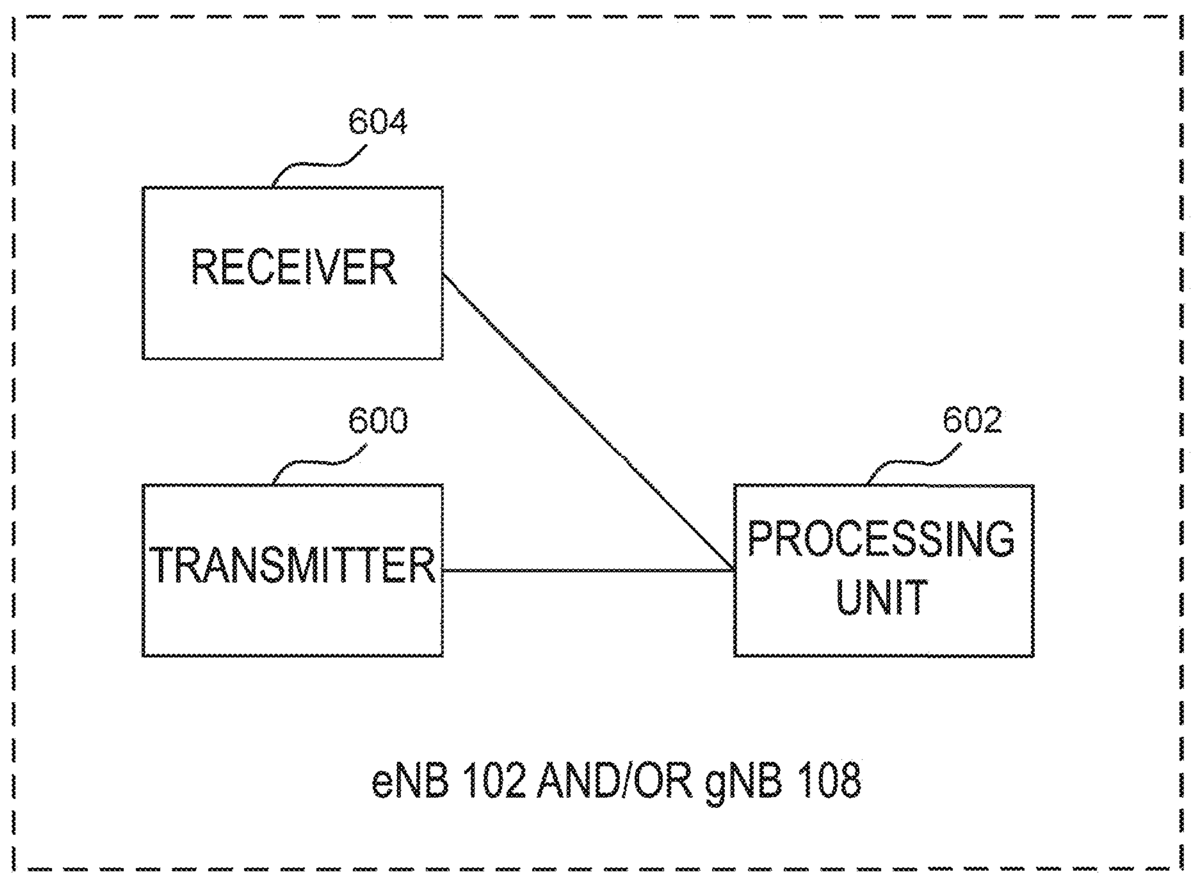
FIG. 6 is a block diagram illustrating a configuration of a base station apparatus according to an embodiment of the present invention.

FIG. 6 is a block diagram illustrating a configuration of the base station apparatus according to an embodiment of the present invention. Note that FIG. 6 illustrates only the main components closely related to an aspect of the present invention in order to avoid complexity of description. The base station apparatus may be the eNB 102, or may be the gNB 108.

The base station apparatus illustrated in FIG. 6 includes a transmitter 600 that transmits an RRC message and the like to the UE 122, a processing unit 602 that creates an RRC message including parameters and transmits the RRC message to the UE 122 to thereby cause the processing unit 502 of the UE 122 to perform processing, and a receiver 604 that receives an RRC message and the like from the UE 122. The processing unit 602 may include a part or all of functions of various layers (for example, the physical layer, the MAC layer, the RLC layer, the PDCP layer, the SDAP layer, the RRC layer, and the NAS layer). In other words, the processing unit 602 may include a part or all of a physical layer processing unit, a MAC layer processing unit, an RLC layer processing unit, a PDCP layer processing unit, an SDAP processing unit, an RRC layer processing unit, and a NAS layer processing unit.

Figure 9:
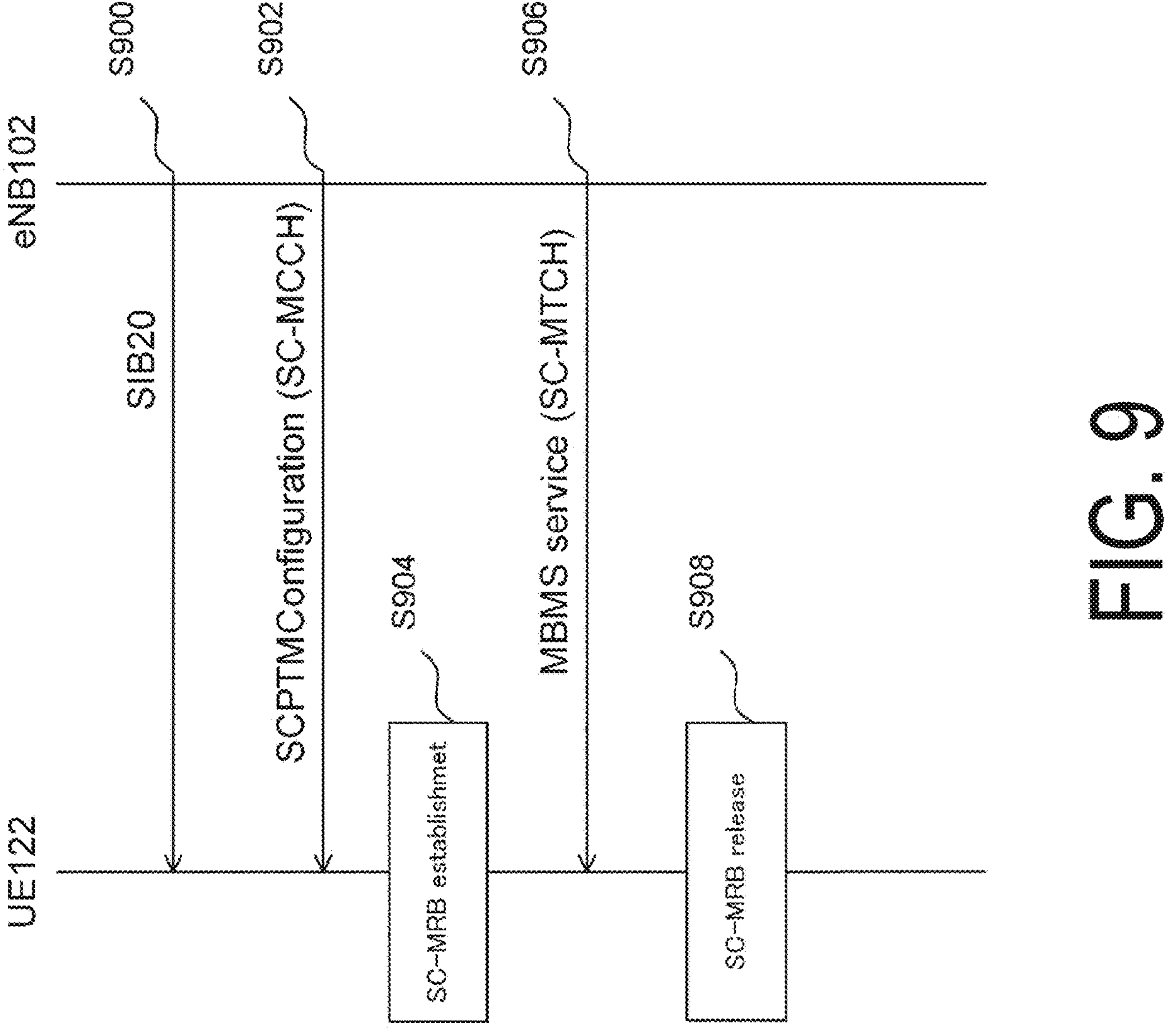
FIG. 9 is a diagram illustrating a flow of a procedure for configuration of MBMS reception using an SC-PTM.

With reference to FIG. 9 to FIG. 11, an overview of operations of MBMS transmission/reception using the SC-PTM will be described. Note that an MBMS, an MBMS service, and an MBMS session, which are terms to be used in the following description, may be terms having the same meanings and may be replaced with each other.

FIG. 9 is a diagram illustrating a flow of a procedure for configuration of MBMS reception using the SC-PTM. FIG. 10 is a diagram illustrating an example of ASN.1 notation representing fields and/or information elements included in System Information Block Type 20 (SIB20) of FIG. 9. FIG. 11 is a diagram illustrating an example of ASN.1 notation representing fields and/or information elements included in an SC-PTM configuration message (SCPTMConfiguration) of FIG. 9.

As illustrated in FIG. 9, the processing unit 602 of the eNB 102 creates the System Information Block type 20 (SIB20) being an RRC message, and transmits the SIB20 from the transmitter 600 to the UE 122 via the BCCH. The receiver 500 of the UE 122 receives the SIB20. (Step S900).

The SIB20 includes information necessary for acquisition of control information (specifically, the SC-MCCH) related to transmission of the MBMS using the SC-PTM. For example, the SIB20 includes a part or all of fields, such as a field represented by sc-mcch-ModificationPeriod indicating a period for which details of the SC-MCCH may be changed, a field represented by sc-mcch-RepetitionPeriod indicating a transmission (retransmission) time interval of the SC-MCCH with the number of radio frames, a field represented by sc-mcch-Offset indicating an offset of the radio frame in which the SC-MCCH is scheduled, a field represented by sc-mcch-FirstSubframe indicating the subframe in which the SC-MCCH is scheduled, and a field represented by sc-mcch-duration indicating a period of the subframe in which the SC-MCCH is scheduled, and/or information elements.

Next, the processing unit of the eNB 102 creates an SC-PTM configuration message (SCPTM Configuration) being an RRC message, and transmits the SC-PTM configuration message from the transmitter 600 via the SC-MCCH. The receiver 500 of the UE 122 receives SC-PTM configuration information, based on the configuration of the SIB20. In the physical layer, a Single Cell RNTI (SC-RNTI) is used for transmission of the SC-MCCH. (Step S902).

The SC-PTM configuration information includes control information that can be applied to MBMS reception. For example, the SC-PTM configuration information includes a part or all of fields, such as a field represented by sc-mtch-InfoList including the configuration of each SC-MTCH in a cell for transmitting the information and a field represented by scptm-NeighbourCellList being a list of neighbor cells that provide the MBMS, and/or information elements.

sc-mtch-InfoList includes one or multiple information elements represented by SC-MTCH-Info. Each SC-MTCH-Info includes a part or all of fields, such as a field represented by mbmsSessionInfo being information of the MBMS session, a field represented by g-RNTI being a Radio Network Temporary Identifier (RNTI) for identifying a multicast group (specifically, the SC-MTCH addressed to a specific group), a field represented by sc-mtch-schedulingInfo being DRX information for SC-MTCH, and a field represented by sc-mtch-neighbourCell being information of a neighboring cell from which the MBMS session can be received using the SC-MTCH. mbmsSessionInfo includes a part or all of fields, such as a field represented by tmgi being a Temporary Mobile Group Identity (TMGI), which is an identifier for identifying an MBMS bearer service, and a field represented by sessionId being an identifier of the MBMS session.

In order to initiate reception of the MBMS session in which the processing unit 502 of the UE 122 is interested, the processing unit 502 may perform Single Cell MBMS Point to Multipoint Radio Bearer (SC-MRB) establishment processing, the SC-MRB being a radio bearer for MBMS session reception using the SC-PTM (Step S904). For example, the SC-MRB establishment processing may be started in a case of initiating the MBMS session, a case that the UE 122 enters a cell where the MBMS service in which the UE 122 is interested is provided via the SC-MRB, a case of starting to take an interest in the MBMS service, a case that a restriction on a UE capability that has restricted reception of the MBMS service is removed, and the like. The SC-MRB establishment processing may be performed in a case that the UE 122 is in the RRC_IDLE state, or may be performed in a case that the UE 122 is in the RRC_CONNECTED state. In a case of performing the SC-MRB establishment processing, the processing unit 502 of the UE 122 may perform a part or all of the following processing of (A) to (D):

(A) establish the RLC entity according to a default configuration of the SC-MCCH and the SC-MTCH;

(B) configure an SC-MTCH logical channel to be applied to the SC-MRB to be established, and instruct the MAC entity to be capable of receiving the MBMS session according to the SC-PTM configuration message for a cell in which the SC-PTM configuration message is received;

(C) configure the physical layer for the SC-MRB to be established, based on sc-mtch-InfoList described above;

(D) indicate tmgi and sessionId corresponding to the established SC-MRB to an upper layer and thereby notify the upper layer of establishment of the SC-MRB.

The processing unit 502 of the UE 122 receives the MBMS session via the established SC-MRB according to the SC-PTM configuration message (Step S906). Before receiving the MBMS session, the processing unit 502 of the UE 122 may create an MBMS interest indication message (MBMSInterestIndication), which is for indicating that the UE 122 is to receive or is interested in receiving the MBMS service to the eNB 102 via the SC-MRB, and transmit the MBMS interest indication message from the transmitter 504 to the eNB 102 (not illustrated). The MBMS interest indication message may include information as to whether or not to prioritize MBMS service reception over unicast reception. The MBMS interest indication message may be transmitted after the SIB20 is received, in a case of transition to the RRC_CONNECTED state, or after transition to the RRC_CONNECTED state. The MBMS interest indication message may be transmitted in a case that the SIB20 is received in a case of handover, or may be transmitted in a case that the SIB20 is received in a case of re-establishment of the RRC connection.

The processing unit 502 of the UE 122 may perform SC-MRB release processing in order to stop reception of the MBMS session (Step S908). For example, the SC-MRB release processing may be started in a case of stopping the MBMS session being received, a case of leaving from a cell in which the SC-MRB is established, a case that the interest in the MBMS service is lost, a case that reception of the MBMS service is restricted due to the restriction on the UE capability, and the like. The SC-MRB release processing may be performed in a case that the UE 122 is in the RRC_IDLE state, or may be performed in a case that the UE 122 is in the RRC_CONNECTED state. In a case of performing the SC-MRB release processing, the processing unit 502 of the UE 122 may perform a part or all of the following processing of (A) to (B):

(A) release a physical layer configuration with the RLC entity of the SC-MRB to be released and the MAC related thereto;

(B) indicate tmgi and sessionId corresponding to the released SC-MRB to an upper layer and thereby notify the upper layer of release of the SC-MRB.

In the above, an overview of operations related to the configuration of MBMS reception using the SC-PTM has been described. MBMS transmission/reception using the MBSFN has also been standardized in addition to MBMS transmission from the base station apparatus/MBMS reception in the terminal apparatus using the SC-PTM (hereinafter referred to as MBMS transmission/reception). However, the MBMS transmission/reception using the SC-PTM and the MBMS transmission/reception using the MBSFN use E-UTRA as their RATs. Multicast Broadcast Service (MBS) transmission/reception using NR as its RAT has not yet been standardized.

With reference to FIG. 5, FIG. 6, and FIG. 12 to FIG. 19, an example of operations of the UE 122 and the gNB 108 according to an embodiment of the present invention will be described. Note that an MBS, an MBS service, and an MBS session, which are terms to be used in an embodiment of the present invention, may be terms having the same meanings and may be replaced with each other. The MBS, the MBS service, and the MBS session, which are terms to be used in an embodiment of the present invention, may be terms having the same meanings as the MBMS, the MBMS service, and the MBMS session. Multicast, a multicast service, and a multicast session, which are terms to be used in an embodiment of the present invention, may be terms having the same meanings and may be replaced with each other. Broadcast, a broadcast service, and a broadcast session, which are terms to be used in an embodiment of the present invention, may be terms having the same meanings and may be replaced with each other. In an embodiment of the present invention, in a case that multicast and broadcast are simply referred to as "MBS(s)" without multicast and broadcast being distinguished, the MBS(s) may be multicast and/or broadcast. Note that, although the base station apparatus according to an embodiment of the present invention will be described using the gNB 108, the base station apparatus may be described using the eNB 102, or may be described using the base station apparatus in the radio access technology of the fifth or later generation.

In the MBS, one or multiple delivery modes may be defined. For example, a delivery mode of the MBS with high QoS requirements may be defined. The "high QoS requirements" may include a requirement of high reliability, or may include a requirement of low delay. For example, a delivery mode of the MBS with low QoS requirements may be defined. In an embodiment of the present invention, the delivery mode of the MBS with high QoS requirements is referred to as delivery mode 1, but may be referred to using another term. In an embodiment of the present invention, the delivery mode of the MBS with low QoS requirements is referred to as delivery mode 2, but may be referred to using another term.

Delivery mode 1 may be a delivery mode that is used for delivery of the multicast session but is not used for delivery of the broadcast session. Delivery mode 1 may be a delivery mode that is used for delivery of the multicast session and delivery of the broadcast session. In a case that delivery mode 1 is used for delivery of the broadcast session, the broadcast session may be the broadcast session with high QoS requirements. Delivery mode 2 may be a delivery mode that is used for delivery of the broadcast session but is not used for delivery of the multicast session. Delivery mode 2 may be a delivery mode that is used for delivery of the multicast session and delivery of the broadcast session. In a case that delivery mode 2 is used for delivery of the multicast session, the multicast session may be the multicast session with low QoS requirements.

Reception of the MBS session delivered in delivery mode 1 may be possible in the UE 122 in the RRC_CONNECTED state, and need not be possible in the UE 122 in the RRC_INACTIVE state and/or the RRC_IDLE state. Reception of the MBS session delivered in delivery mode 1 may be possible in the UE 122 in the RRC_CONNECTED state, and may also be possible after the UE 122 that has initiated the reception of the MBS session in the RRC_CONNECTED state has transitioned to the RRC_INACTIVE state and/or the RRC_IDLE state. Reception of the MBS session delivered in delivery mode 2 may be possible in the UE 122 in the RRC_CONNECTED state, and/or the RRC_INACTIVE state, and/or the RRC_IDLE state.

In an embodiment of the present invention, for the UE 122, a radio bearer for the MBS may be established and/or configured for MBS reception. In the gNB 108, the radio bearer for the MBS may be established and/or configured for MBS transmission. In an embodiment of the present invention, a term "Multicast Radio Bearer (MRB)" is used for the radio bearer for the MBS, but another term may be used. The UE 122 may establish and/or configure the MRB in accordance with parameters included in an RRC message received from the gNB 108. The UE 122 may establish and/or configure the MRB in accordance with default information stored in the UE 122. The UE 122 may establish and/or configure the MRB in accordance with the parameters included in an RRC message received from the gNB 108 and the default information stored in the UE 122.

As the MRBs, one or multiple types of MRBs may be defined. For example, an MRB for delivery mode 1 may be defined. An MRB for delivery mode 2 may be defined. Each of the MRB for delivery mode 1 and the MRB for delivery mode 2 may be alternatively referred to using another term. For example, the MRB for delivery mode 1 may be alternatively referred to as a mode 1 MRB, and the MRB for delivery mode 2 may be alternatively referred to as a mode 2 MRB. For example, the MRB for delivery mode 1 may be alternatively referred to as a type 1 MRB, and the MRB for delivery mode 2 may be alternatively referred to as a type 2 MRB. Alternative references to the MRB for delivery mode 1 and the MRB for delivery mode 2 need not be limited to this. In an embodiment of the present invention, in a case that the MRB for delivery mode 1 and the MRB for delivery mode 2 are simply referred to as "MRB(s)" without the MRB for delivery mode 1 and the MRB for delivery mode 2 being distinguished, the MRB(s) may be the MRB for delivery mode 1 and/or the MRB for delivery mode 2.

For the MRB, a leg for receiving the MBS in a Point-to-Multipoint manner and a leg for receiving the MBS in a Point-to-Point manner may be established and/or configured. For the MRB, only the leg for receiving the MBS in a point-to-multipoint manner may be established and/or configured. For the MRB, only the leg for receiving the MBS in a point-to-point manner may be established and/or configured. The leg may be the RLC bearer. The leg may be the logical channel. In a case that the MRB having the RLC bearer for receiving the MBS in a point-to-multipoint manner and the RLC bearer for receiving the MBS in a point-to-point manner is established and/or configured for the UE 122, the RLC bearer for receiving the MBS in a point-to-multipoint manner and the RLC bearer for receiving the MBS in a point-to-point manner may be associated with one PDCP entity established and/or configured for the MRB. In a case that the MRB having the logical channel for receiving the MBS in a point-to-multipoint manner and the logical channel for receiving the MBS in a point-to-point manner is established and/or configured for the UE 122, the logical channel for receiving the MBS in a point-to-multipoint manner and the logical channel for receiving the MBS in a point-to-point manner may be associated with one of one or multiple RLC entities established and/or configured for the MRB. Note that "to receive the MBS in a point-to-multipoint manner" may be alternatively expressed as "to deliver the MBS in a point-to-multipoint manner". "To receive the MBS in a point-to-point manner" may be alternatively expressed as "to deliver the MBS in a point-to-point manner".

In a case that the UE 122 receives the MBS in a point-to-multipoint manner, a function for receiving the MBS in a point-to-multipoint manner may be established and/or configured for the UE 122. The UE 122 may establish and/or configure the function for receiving the MBS in a point-to-multipoint manner in accordance with an RRC message received from the gNB 108. The function for receiving the MBS in a point-to-multipoint manner may be a function of receiving the MBS that is transmitted using the logical channel for transmitting the MBS in a point-to-multipoint manner. The function for receiving the MBS in a point-to-multipoint manner may be a function of obtaining the scheduling information of the MBS transmitted in a point-to-multipoint manner. In an embodiment of the present invention, a term "Multicast Traffic Channel (MTCH)" is used for the logical channel for transmitting the MBS in a point-to-multipoint manner, but another term may be used. The UE 122 may establish and/or configure an identifier for identifying MBS transmission using the MTCH in accordance with an RRC message received from the gNB 108. In an embodiment of the present invention, a term "Group Radio Network Temporary Identifier (G-RNTI)" is used for the identifier for identifying MBS transmission using the MTCH, but another term may be used. In an embodiment of the present invention, a term "Group Configured Scheduling Radio Network Temporary Identifier (G-CS-RNTI)" is used for an identifier for identifying MBS transmission using the MTCH in Configured Scheduling, but another term may be used. The identifier for identifying MBS transmission using the MTCH may be alternatively referred to as an identifier for identifying MBS scheduling information using the MTCH. The G-RNTI and the MBS session may be one-to-one mapping, and the G-RNTI and the information for identifying the MBS session may be one-to-one mapping. The G-CS-RNTI and the MBS session may be one-to-one mapping, and the G-CS-RNTI and the information for identifying the MBS session may be one-to-one mapping. In an embodiment of the present invention, a term "Temporary Mobile Group Identity (TMGI)" is used for the information for identifying the MBS session, but another term may be used. For the information for identifying the MBS session, a session identifier (Session ID) may be used, or the TMGI and the session identifier may be used. The function for receiving the MBS in a point-to-multipoint manner may be a function of monitoring the PDCCH for the G-RNTI and/or the G-CS-RNTI. The function for receiving the MBS in a point-to-multipoint manner may be a function of attempting to decode received data in a case of reception of a downlink assignment on the PDCCH for the G-RNTI and/or the G-CS-RNTI. The function for receiving the MBS in a point-to-multipoint manner may be a function of attempting to decode data received with configured downlink scheduling for the G-CS-RNTI.

The MTCH may be a multicast and/or broadcast traffic channel. The MTCH may be used by the UE 122 only in a case that the UE 122 receives the MBS. For the MTCH, other terms may be used, such as an MBS-MTCH and an NR-MTCH. The MTCH may be mapped to the DL-SCH being a downlink transport channel.

Note that reception of the MBS in a point-to-point manner may be reception of the MBS transmitted using a logical channel for dedicated user data such as a DTCH logical channel. Reception of the MBS in a point-to-point manner may be performed based on reception of a downlink assignment on the PDCCH for the C-RNTI. Reception of the MBS in a point-to-point manner may be performed based on reception with configured downlink scheduling for a Configured Scheduling Radio Network Temporary Identifier (CS-RNTI).

Note that, in a case that the MBS is received in a point-to-point manner, the DRB may be used. The DRB and the MRB may be distinguished by a difference of an AS security function in the PDCP layer. In the PDCP entity established for the MRB, AS security need not be configured. In the PDCP entity established for the MRB, second AS security may be configured, which is different from first AS security configured for the PDCP entity established for the DRB. In the PDCP entity established for the MRB, fourth AS security may be configured, which is established for the DRB associated with the same PDU session as the PDU session associated with the MRB and is different from third AS security configured for the PDCP entity. The AS security may be ciphering and deciphering and/or integrity protection and verification.

The MRB for delivery mode 1 may be established for the UE 122, based on a fact that the UE 122 receives, from the gNB 108, an RRC message transmitted using the DCCH. The RRC message transmitted using the DCCH may be the RRC reconfiguration message. The RRC message transmitted using the DCCH may be another RRC message different from the RRC reconfiguration message. The MRB for delivery mode 2 may be established based on a fact that the UE 122 receives, from the gNB 108, an RRC message transmitted using a point-to-multipoint downlink channel (downlink logical channel) for transmitting MBS control information for one or multiple MTCHs. In an embodiment of the present invention, a term "Multicast Control Channel (MCCH)" is used for the point-to-multipoint downlink channel (downlink logical channel) for transmitting MBS control information for one or multiple MTCHs, but another term may be used. For example, for the MCCH, other terms may be used, such as an MBS-MCCH and an NR-MCCH. The MCCH may be a multicast and/or broadcast control channel. The MCCH may be mapped to the DL-SCH being a downlink transport channel.

Figure 12:
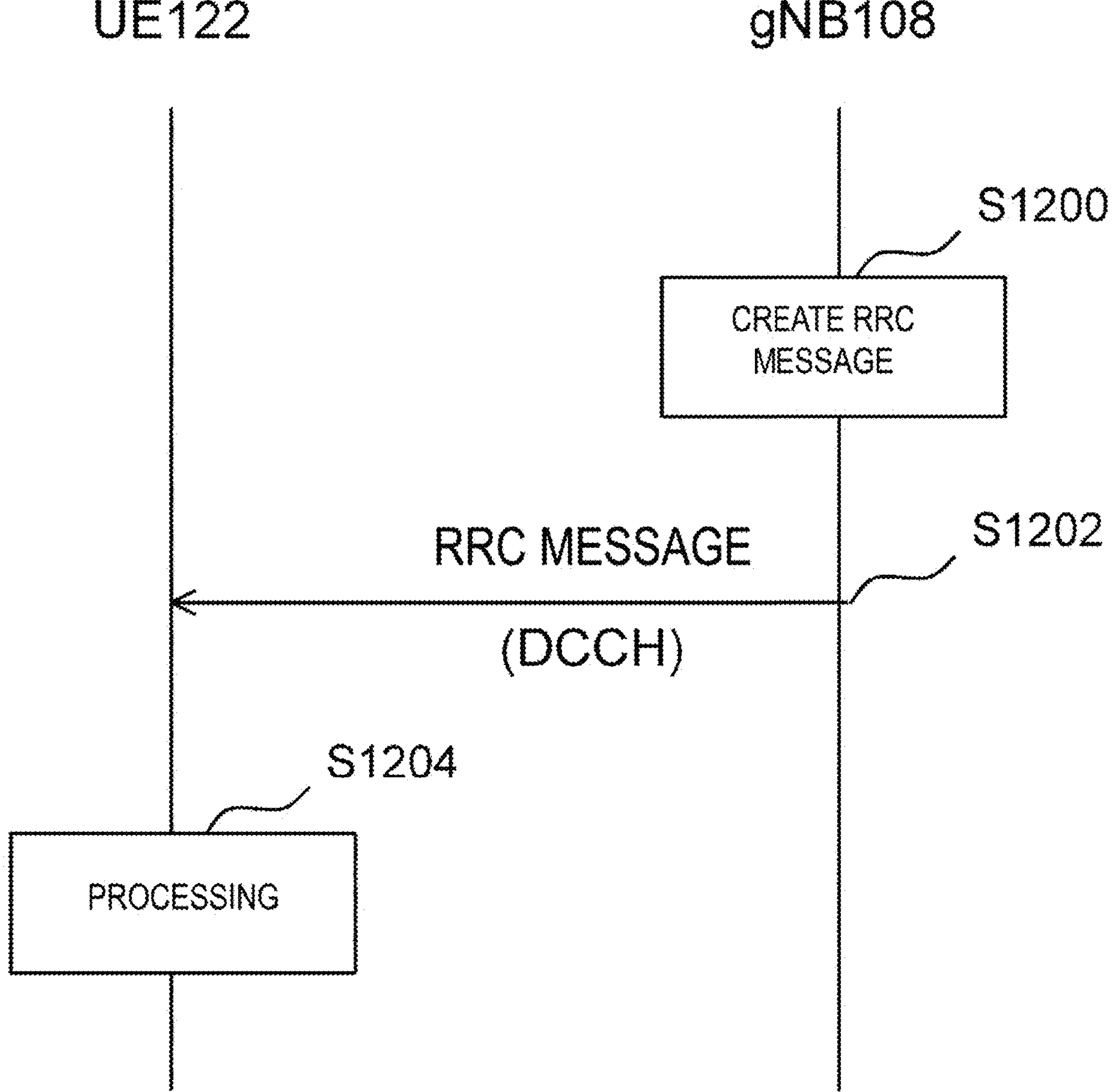
FIG. 12 is a diagram illustrating an example of a means related to establishment and/or configuration of an MBS for delivery mode 1 according to an embodiment of the present invention.

With reference to FIG. 5 to FIG. 6 and FIG. 12 to FIG. 13, a means by which the UE 122 establishes and/or configures the MRB for delivery mode 1 in accordance with an RRC message received from the gNB 108 will be described. FIG. 12 is an example of a means related to establishment and/or configuration of the MBS for delivery mode 1 according to an embodiment of the present invention. In FIG. 12, the processing unit 602 of the gNB 108 creates an RRC message (Step S1200). The RRC message may include parameters necessary for the UE 122 to establish and/or configure the MRB for delivery mode 1.

FIG. 13 illustrates an example of ASN.1 indicating the parameters for establishing and/or configuring the MRB for delivery mode 1 that are included in the RRC message that the UE 122 receives from the gNB 108. In FIG. 13, an information element represented by MRB-ToAddMod may be an information element indicating an MRB (radio bearer for the MBS) configuration. The information element represented by MRB-ToAddMod may be alternatively referred to as an MRB configuration information element or an MRB configuration. An information element represented by MRB-ToAddModList may be a list of MRB configurations. The list of MRB configurations may be alternatively referred to as an MRB configuration list information element or an MRB configuration list parameter. An information element represented by MRB-Identity in the MRB configuration information element may be information of an MRB identity of an MRB to be added or modified, and may be an identity for uniquely identifying the MRB in each terminal apparatus. The information element represented by MRB-Identity in the MRB configuration information element may be alternatively referred to as an MRB identity information element or an MRB identity. The MRB identity may be alternatively referred to as a radio bearer identity. As illustrated in FIG. 13, the MRB configuration information element may include a part or all of the parameters of the SDAP configuration information element and the PDCP configuration information element illustrated in FIG. 7. As illustrated in FIG. 7, the SDAP configuration information element may include a PDU session identifier. An information element represented by MRB-ToReleaseList may be an information element indicating a list of MRBs to be released. The information element indicating the list of MRBs to be released may include MRB identities of the MRBs to be released.

In FIG. 13, an information element represented by RLC-Bearer-Config may be an information element indicating an RLC bearer configuration. The information element represented by RLC-Bearer-Config may be alternatively referred to as an RLC bearer configuration information element or an RLC bearer configuration. A field represented by rlc-BearerToAddModList may be a list of RLC bearer configurations. An information element represented by LogicalChannelIdentity in the RLC bearer configuration may be an information element indicating a MAC logical channel for the RLC bearer established and/or configured with the RLC bearer configuration. The information element represented by MRB-Identity in the RLC bearer configuration may be the MRB identity, and the MRB identity of the MRB associated with the RLC bearer established and/or configured with the RLC bearer configuration. An information element represented by RLC-Config in the RLC bearer configuration may be an information element indicating an RLC configuration. The information element represented by RLC-Config may be alternatively referred to as an RLC configuration information element or an RLC configuration. Note that the RLC bearer configuration may include information indicating that it is the RLC bearer for receiving the MBS in a point-to-multipoint manner, information indicating whether or not it is the RLC bearer for receiving the MBS in a point-to-multipoint manner, information indicating that it is the RLC bearer for receiving the MBS in a point-to-point manner, information indicating whether or not it is the RLC bearer for receiving the MBS in a point-to-point manner, and the like (not illustrated).

In Step S1200, the RRC message created by the processing unit 602 of the gNB 108 may include information of the G-RNTI and/or the G-CS-RNTI. The information of the G-RNTI and/or the G-CS-RNTI may be included in the RLC bearer configuration, or may be included in the MRB configuration (not illustrated). The MRB configuration information element may include an information element and/or a field indicating the MAC logical channel for the RLC bearer for receiving the MBS in a point-to-multipoint manner. The MRB configuration information element may include an information element and/or a field indicating the MAC logical channel for the RLC bearer for receiving the MBS in a point-to-point manner (not illustrated).

Next, the transmitter 600 of the gNB 108 transmits the RRC message generated in Step S1200 to the UE 112 (Step S1202). In a case that the gNB 108 transmits the RRC message to the UE 112, the gNB 108 may transmit the RRC message using the DCCH logical channel. The RRC message may be the RRC reconfiguration message, for example.

Next, the receiver 500 of the UE 112 receives the RRC message, and the processing unit 502 of the UE 122 may establish and/or configure the MRB for delivery mode 1 in accordance with the received RRC message (Step S1204). The processing unit 502 of the UE 112 may determine that the MRB to be established and/or configured is the MRB for delivery mode 1, based on a fact that the received RRC message is the RRC message transmitted from the gNB 108 using the DCCH logical channel. The processing unit 502 of the UE 112 may determine that the MRB to be established and/or configured is the MRB for delivery mode 1, based on a fact that the received RRC message is the RRC reconfiguration message. The processing unit 502 of the UE 122 may determine that the MRB is the MRB for delivery mode 1, based on a fact that the established and/or configured MRB is related to a PDU session. Note that, in Step S1200 to Step S1204, the UE 122 may be in the RRC_CONNECTED state.

Figure 14:
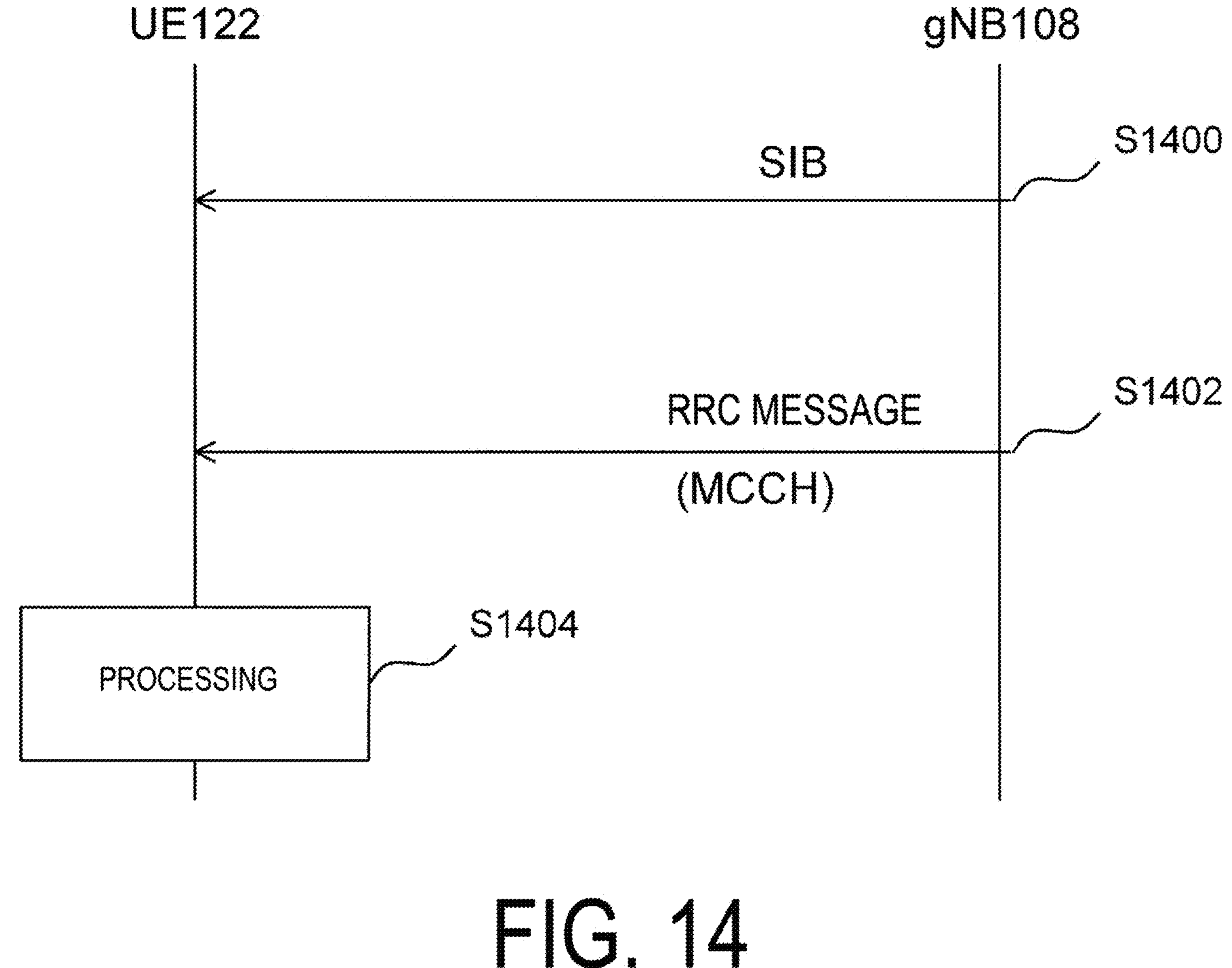
FIG. 14 is a diagram illustrating an example of a means related to establishment and/or configuration of an MBS for delivery mode 2 according to an embodiment of the present invention.

With reference to FIG. 5, FIG. 6, and FIG. 14, a means by which the UE 122 establishes and/or configures the MRB for delivery mode 2 will be described. FIG. 14 is an example of a means related to establishment and/or configuration of the MBS for delivery mode 2 according to an embodiment of the present invention. Is a diagram illustrating.

As illustrated in FIG. 14, in order to broadcast information necessary for acquisition of control information related to the MBS transmission, the processing unit 602 of the gNB 108 may create a first System Information Block (SIB) being a type of RRC message, and transmit the SIB from the transmitter 600 to the UE 122. The receiver 500 of the UE 122 receives the first SIB. Note that the first SIB may be transmitted via a BCCH logical channel, or may be transmitted via another logical channel. The information necessary for acquisition of control information related to the MBS transmission may be information related to the MCCH. (Step S1400)

For example, the first SIB may include a part or all of parameters, such as a parameter indicating a period for which details of the MCCH may be changed, a parameter related to a transmission (retransmission) time interval of the MCCH, a parameter indicating an offset of the radio frame in which the MCCH is scheduled, a parameter indicating a slot in which the MCCH is scheduled, and a parameter indicating a period of the slot in which the MCCH is scheduled. Note that the parameter related to the transmission (retransmission) time interval of the MCCH may be represented by the number of radio frames.

Next, the processing unit 602 of the gNB 108 may create an RRC message to be transmitted on the MCCH, and transmit the RRC message from the transmitter 600. The receiver 500 of the UE 122 may receive the RRC message transmitted on the MCCH, based on the configuration of the first SIB. For the transmission of the MCCH, a dedicated Radio Network Temporary Identifier (RNTI) for identifying the MCCH transmission may be used. As a value of the dedicated RNTI for identifying the MCCH transmission, a specific value may be used, or a value may be configured by the first SIB. In an embodiment of the present invention, a message name of MBS configuration information message is used to refer to the RRC message to be transmitted on the MCCH, but other message names may be used. (Step S1402)

The MBS configuration information message may include one or multiple MTCH parameters, each of which is a parameter for MBS reception. For example, regarding the MTCH parameters, one or multiple MTCH parameters may be included in the MBS configuration information message in a form of a list, so that an information element represented by SC-MTCH-InfoList in FIG. 11 includes one or multiple information elements represented by SC-MTCH-Info in a form of a list. The MTCH parameter may be present for each MBS session. For example, a first MTCH parameter may be present for a first MBS session, and a second MTCH parameter may be present for a second MBS session. Note that, in an embodiment of the present invention, the parameter for MBS reception will be described using a term "MTCH parameter", but another term may be used.

The MTCH parameters may include a part or all of a parameter related to information of the MBS session, a parameter indicating the RNTI for identifying a multicast and/or broadcast group (MTCH addressed to a specific group), a parameter indicating the logical channel identity, a parameter related to the DRX information for the MTCH, and a parameter indicating a list of neighboring cells providing the same MBS. The parameter indicating the RNTI for identifying a multicast and/or broadcast group (MTCH addressed to a specific group) may be the G-RNTI. For example, the parameter related to the information of the MBS session may include a part or all of parameters, such as a parameter indicating a Temporary Mobile Group Identity (TMGI) being an identifier for identifying the MBS, a parameter indicating Session ID being an identifier of the MBS session, a parameter indicating a PDU session to which the MBS session belongs, and a parameter indicating a QoS flow used for the MBS session.

Note that the parameter indicating the list of neighbor cells that provide the same MBS may include a parameter indicating a list of neighbor cells that provide the same MBS via the MTCH and/or the MRB, or may include a parameter indicating a list of neighbor cells that provide the same MBS via unicasting, and/or the DTCH, and/or the DRB.

The MBS configuration information message and/or the MBS MTCH parameter may include a parameter related to an MRB configuration. The parameter related to the MRB configuration may include a part or all of parameters including an identifier for identifying the MRB, an SDAP configuration information element, and a PDCP configuration information element. The parameter related to the MRB configuration may include one or multiple RLC bearer configuration information elements. The RLC bearer configuration information elements may include a part or all of an RLC configuration information element for establishing and/or configuring the RLC entity, and a logical channel information element for the logical channel configuration. The RLC bearer configuration information elements may be included in an information element different from the MRB configuration, and may be associated with the parameter related to the MRB configuration with the identifier for identifying the MRB or the like. The MRB configuration may include a parameter for identifying the RLC bearer that receives the MBS using point-to-multipoint connection. The MRB configuration may include a parameter for identifying the RLC bearer that receives the MBS using point-to-point connection. The parameter for identifying the RLC bearer that receives the MBS using point-to-multipoint connection and/or the parameter for identifying the RLC bearer that receives the MBS using point-to-point connection may be the logical channel identity. Note that the MRB for delivery mode 2 need not include the RLC bearer for receiving the MBS in a point-to-point manner. In other words, the MRB for delivery mode 2 may have a function of receiving the MBS only in a point-to-multipoint manner.

The UE 122 receives the MBS configuration information message from the receiver 500, and the processing unit 502 of the UE 122 may establish and/or configure the MRB for delivery mode 2 in accordance with the received MBS configuration information message (Step S1404). The processing unit 502 of the UE 112 may determine that the MRB to be established and/or configured is the MRB for delivery mode 2, based on a fact that the received MBS configuration information message is the RRC message transmitted from the gNB 108 using the MCCH logical channel. The processing unit 502 of the UE 112 may determine that the MRB to be established and/or configured is the MRB for delivery mode 2, based on a fact that the received RRC message is the MBS configuration information message. The processing unit 502 of the UE 122 may determine that the MRB is the MRB for delivery mode 2, based on a fact that the established and/or configured MRB is not related to a PDU session. Note that, in Step S1400 to Step S1404, the UE 122 may be in a state of one of the RRC_CONNECTED state, the RRC_INACTIVE state, and the RRC_IDLE state.

Note that, in a case that the UE 122 establishes and/or configures the MRB, the UE 122 may use only the default information stored in the UE 122. In the case that the UE 122 establishes and/or configures the MRB, the default information stored in the UE 122 may be used, in addition to information necessary for MRB establishment and/or configuration included in the RRC message received from the gNB 108. In a case that the UE 122 establishes and/or configures the MRB for delivery mode 1, information including a part or all of the following (A) and (B) may be used, in addition to the information necessary for MRB establishment and/or configuration included in the RRC message received from the gNB 108 via the DCCH:

(A) default information stored in the UE 122;

(B) information necessary for MRB establishment and/or configuration included in the RRC message received from the gNB 108 via the MCCH.

Next, operation of the UE 122 for which the MRB is established and/or configured will be described.

Figure 15:
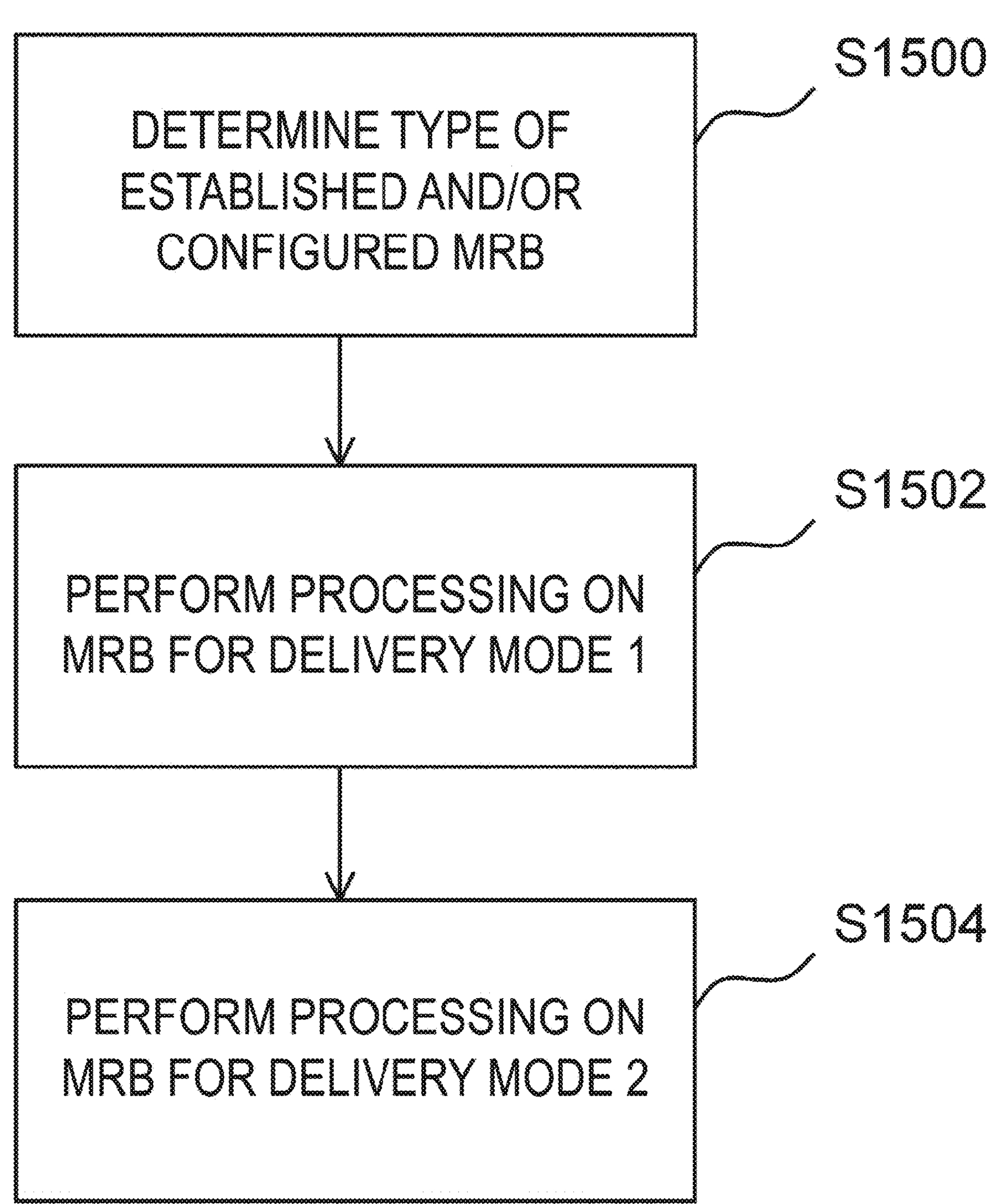
FIG. 15 is a diagram illustrating a first example of processing in a UE 122 according to an embodiment of the present invention.

FIG. 15 is a diagram illustrating a first example of processing in the UE 122 according to an embodiment of the present invention. The processing unit 502 of the UE 122 may determine whether the established and/or configured MRB is the MRB for delivery mode 1 or the MRB for delivery mode 2 (Step S1500). The processing unit 502 of the UE 112 may determine that the MRB is the MRB for delivery mode 1, based on a fact that the MRB is established and/or configured in accordance with the RRC message transmitted from the gNB 108 using the DCCH logical channel. The processing unit 502 of the UE 112 may determine that the MRB is the MRB for delivery mode 1, based on a fact that the MRB is established and/or configured in accordance with the RRC reconfiguration message transmitted from the gNB 108. The processing unit 502 of the UE 122 may determine that the MRB is the MRB for delivery mode 1, based on a fact that the MRB is related to a PDU session. The processing unit 502 of the UE 112 may determine that the MRB is the MRB for delivery mode 2, based on a fact that the MRB is established and/or configured in accordance with the RRC message transmitted from the gNB 108 using the MCCH logical channel. The processing unit 502 of the UE 122 may determine that the MRB is the MRB for delivery mode 2, based on a fact that the MRB is not related to a PDU session. Note that a method for determining whether the MRB is the MRB for delivery mode 1 or the MRB for delivery mode 2 need not be limited to the above method.

In Step S1500, the processing unit 502 of the UE 122 may consider that the MRB determined as the MRB for delivery mode 1 is a radio bearer. In a case that the processing unit 502 of the UE 122 performs processing of releasing all of the radio bearers, the processing unit 502 may release all of the MRBs for delivery mode 1. In the case that the processing unit 502 of the UE 122 performs processing of releasing all of the radio bearers, the processing unit 502 may release radio bearers including all of the SRBs and all of the DRBs in addition to releasing all of the MRBs for delivery mode 1. In the case that the processing unit 502 of the UE 122 performs processing of releasing all of the radio bearers, and the MRBs for delivery mode 1 are established and/or configured, the processing unit 502 may release all of the MRBs for delivery mode 1 (Step S1502). Note that "release" in the above may be alternatively expressed as "suspend".

In Step S1500, the processing unit 502 of the UE 122 may consider that the MRB determined as the MRB for delivery mode 2 is not a radio bearer. In the case that the processing unit 502 of the UE 122 performs processing of releasing all of the radio bearers, the processing unit 502 need not release the MRB for delivery mode 2 (Step S1504). Note that "release" in the above may be alternatively expressed as "suspend".

Figure 16:
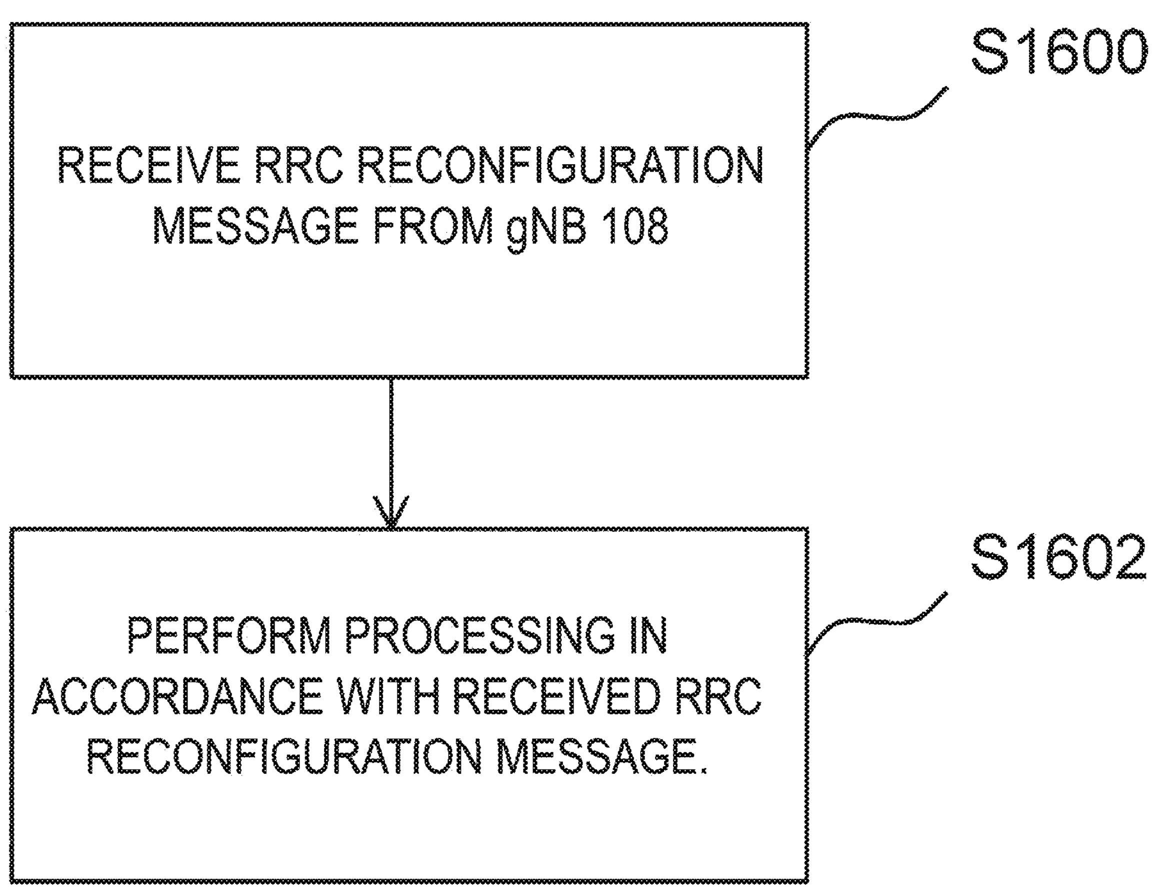
FIG. 16 is a diagram illustrating a second example of processing in the UE 122 according to an embodiment of the present invention.

FIG. 16 is a diagram illustrating a second example of processing in the UE 122 according to an embodiment of the present invention. The receiver 500 of the UE 122 receives the RRC reconfiguration message from the gNB 108 (Step S1600).

Next, the processing unit 502 of the UE 122 may resume the MRB, based at least on a fact that the RRC reconfiguration message received from the gNB 108 in Step S1600 is a first RRC reconfiguration message received after successful completion of an RRC reestablishment procedure. The processing unit 502 of the UE 122 may resume the MRB for delivery mode 1, based at least on a fact that the RRC reconfiguration message received from the gNB 108 in Step S1600 is the first RRC reconfiguration message received after successful completion of the RRC reestablishment procedure (Step S1602). Note that the successful completion of the RRC reestablishment procedure may be a fact that the UE 122 receives an RRC reestablishment message being a response message from the gNB 108 in response to the RRC reestablishment request message transmitted from the UE 122 to the gNB 108. The successful completion of the RRC reestablishment procedure may be a fact that the UE 122 receives the RRC reestablishment message being a response message from the gNB 108 in response to the RRC reestablishment request message transmitted from the UE 122 to the gNB 108 and the UE 122 transmits the RRC reestablishment complete message to the gNB 108. Note that, in a case that the RRC reconfiguration message received from the gNB 108 in Step S1600 is not the first RRC reconfiguration message received after successful completion of the RRC reestablishment procedure, the processing unit 502 of the UE 122 need not resume the MRB.

Figure 17:
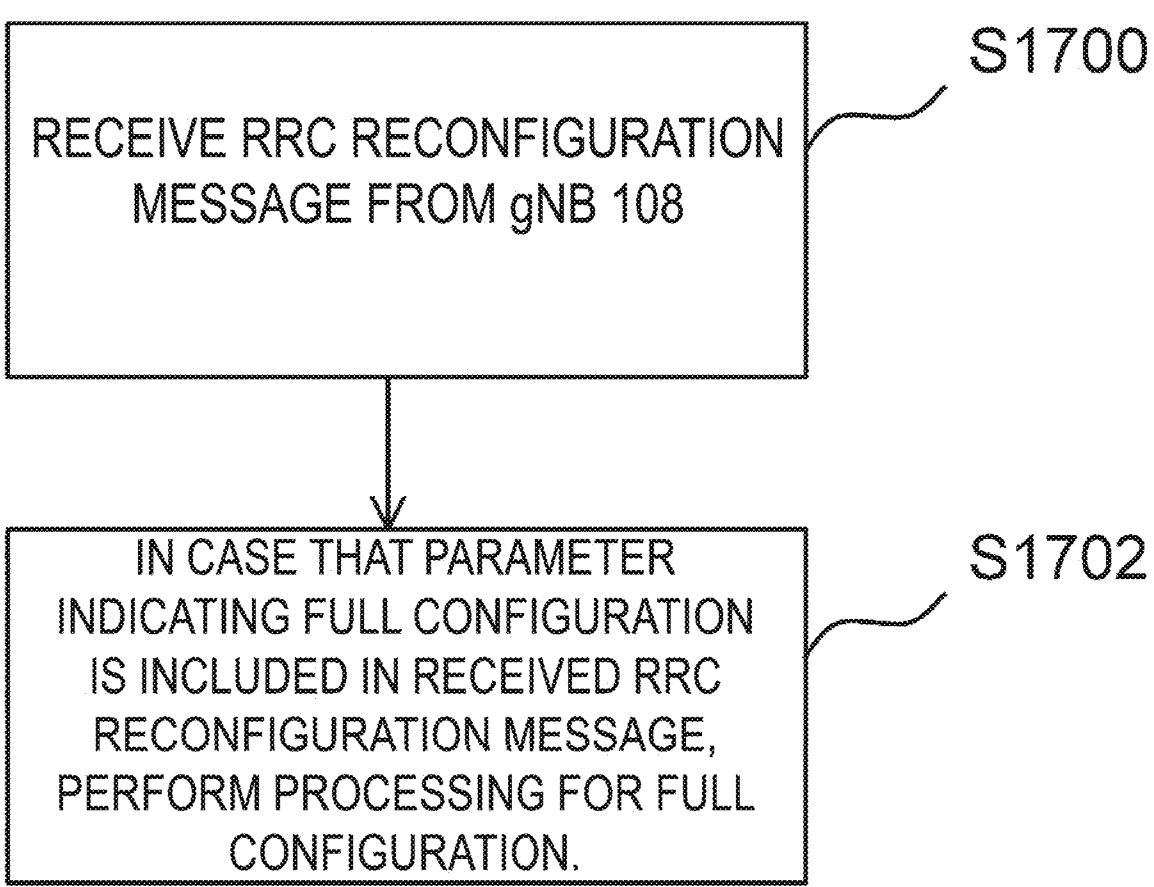
FIG. 17 is a diagram illustrating a third example of processing in the UE 122 according to an embodiment of the present invention.

FIG. 17 is a diagram illustrating a third example of processing in the UE 122 according to an embodiment of the present invention. The receiver 500 of the UE 122 receives the RRC reconfiguration message from the gNB 108 (Step S1700).

The processing unit 502 of the UE 122 determines whether a parameter indicating the full configuration is included in the received RRC reconfiguration message. The processing unit 502 of the UE 112 that has determined that the parameter indicating the full configuration is included may perform processing for the full configuration, based at least on a fact that the parameter indicating the full configuration is included (Step S1702). Note that the processing unit 502 of the UE 112 that has determined that the parameter indicating the full configuration is not included need not perform the processing for the full configuration.

In the processing for the full configuration of Step S1702, the processing unit 502 of the UE 122 may perform dedicated radio configuration release processing configured for the UE 122. In the dedicated radio configuration release processing, processing of releasing the G-RNTI and/or the G-CS-RNTI may be excluded. In the dedicated radio configuration release processing, processing of releasing the G-CS-RNTI may be excluded. The G-RNTI and/or the G-CS-RNTI may be a parameter included in the RRC message transmitted from the base station apparatus, using the DCCH logical channel. The RRC message transmitted using the DCCH logical channel may be the RRC reconfiguration message, or may be another RRC message.

In the processing for the full configuration of Step S1702, the processing unit 502 of the UE 122 may release the MRB associated with the PDU session configured for the UE 122. In the processing for the full configuration of Step S1702, the processing unit 502 of the UE 122 may release the MRB for delivery mode 1 associated with the PDU session configured for the UE 122.

In the processing for the full configuration of Step S1702, the processing unit 502 of the UE 122 may perform processing including the following (A) for each PDU session not to be added with the DRB configuration list parameter and/or the MRB configuration list parameter included in the RRC message received in Step S1700 out of the PDU sessions already configured for the UE 122. Note that the DRB configuration list parameter may be alternatively referred to as the DRB configuration. The MRB configuration list parameter may be alternatively referred to as the MRB configuration. (A) is as follows:

(A) indicate, to an upper layer, a fact that user plane resources for each PDU session not to be added have been released.

Figure 18:
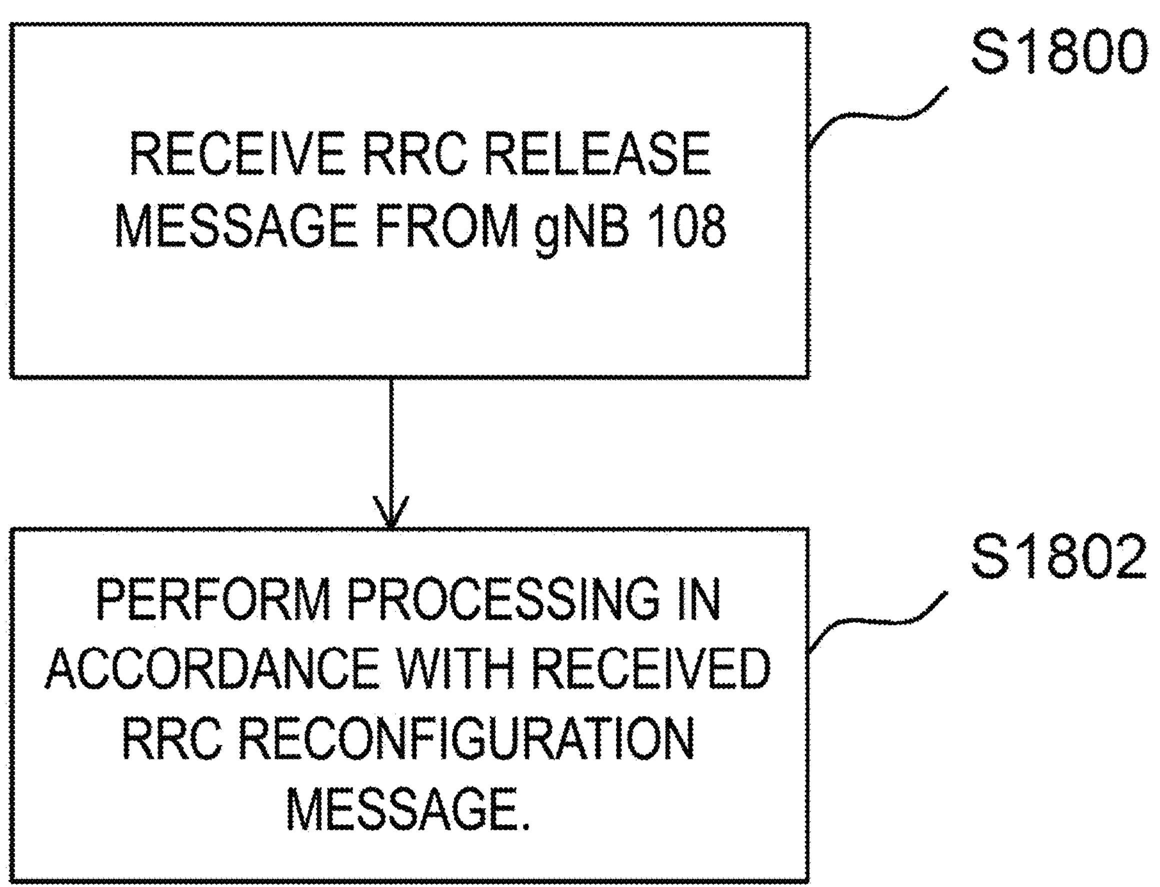
FIG. 18 is a diagram illustrating a fourth example of processing in the UE 122 according to an embodiment of the present invention.

FIG. 18 is a diagram illustrating a fourth example of processing in the UE 122 according to an embodiment of the present invention. The receiver 500 of the UE 122 receives the RRC release message from the gNB 108 (Step S1800).

The processing unit 502 of the UE 122 determines whether a suspend configuration parameter is included in the received RRC release message. The processing unit 502 of the UE 112 that has determined that the suspend configuration parameter is included may suspend or release the MRB, based at least on a fact that the suspend configuration parameter is included. The processing unit 502 of the UE 112 that has determined that the suspend configuration parameter is included may suspend or release the MRB for delivery mode 1, based at least on a fact that the suspend configuration parameter is included. (Step S1802). Note that the processing unit 502 of the UE 112 that has determined that the suspend configuration parameter is not included need not suspend the MRB. The suspend configuration parameter may be a parameter indicating a configuration for the RRC_INACTIVE state.

Figure 19:
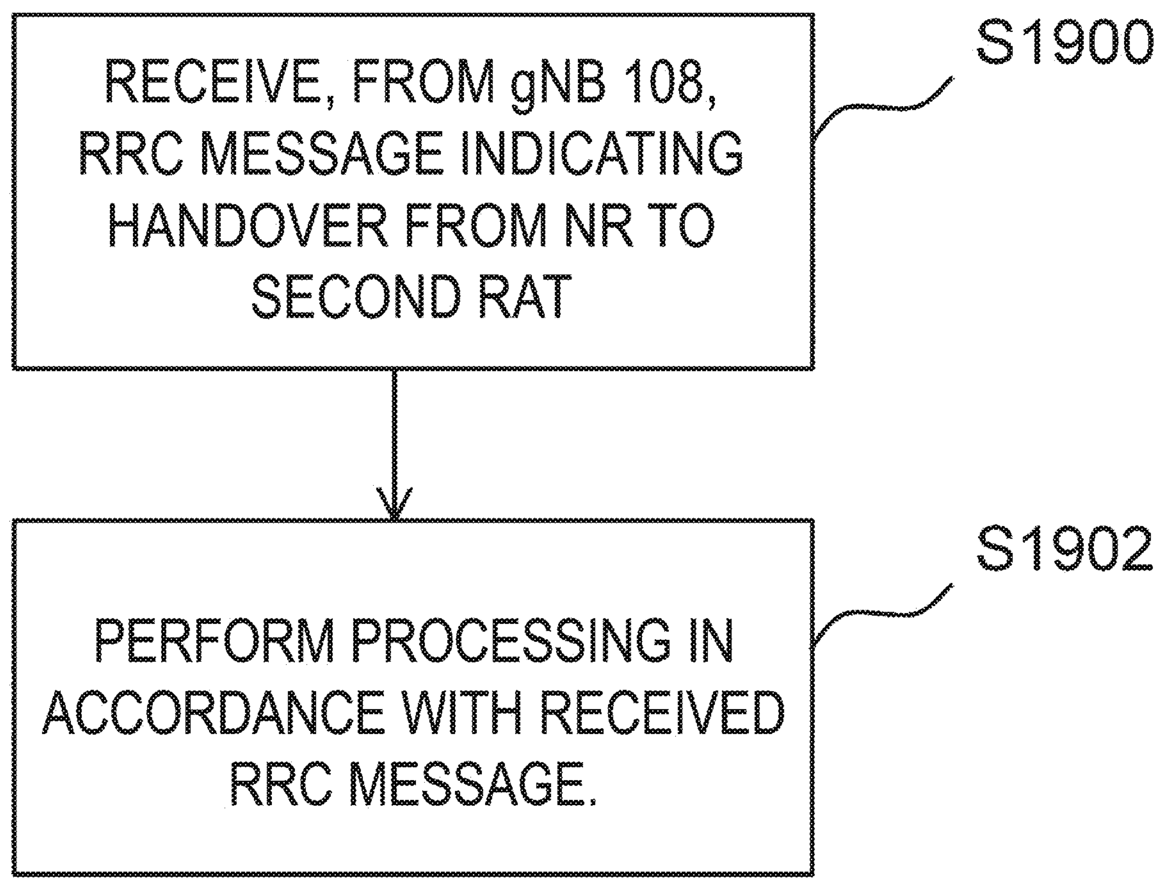
FIG. 19 is a diagram illustrating a fifth example of processing in the UE 122 according to an embodiment of the present invention.

FIG. 19 is a diagram illustrating a fifth example of processing in the UE 122 according to an embodiment of the present invention. The receiver 500 of the UE 122 receives, from the gNB 108, the RRC message indicating handover from NR to a second RAT (Step S1900). Note that the RRC message indicating handover from NR to the second RAT may be an RRC message referred to as a mobility from NR command (MobilityFromNRCommand).

The processing unit 502 of the UE 122 may release the PDCP entity and/or the SDAP entity for the MRB configured for the UE 122, based at least on a fact that handover in accordance with the received RRC message indicating handover from NR to the second RAT has successfully completed. The processing unit 502 of the UE 122 may release the PDCP entity and/or the SDAP entity for the MRB for delivery mode 2 configured for the UE 122, based on a fact that handover in accordance with the received RRC message indicating handover from NR to the second RAT has successfully completed (Step S1902). Note that, in a case that handover in accordance with the RRC message indicating handover from NR to the second RAT fails, the PDCP entity and/or the SDAP entity for the MRB need not be released.

Note that, in the above description, the RLC bearer for receiving the MBS in a point-to-point manner and/or the logical channel for receiving the MBS in a point-to-point manner may have a function of transmitting feedback on the MBS to the gNB 108. The function of transmitting feedback on the MBS to the gNB 108 may be a function of transmitting the PDCP status report to the gNB 108. The function of transmitting feedback on the MBS to the gNB 108 may be a function of transmitting the RLC status report to the gNB 108.

Note that, in the above description, multicast may be alternatively referred to as broadcast. In the above description, multicast may be alternatively referred to as multicast and broadcast.

Note that, in the above description, the RLC bearer may be referred to as the RLC entity. In the above description, the RLC bearer may be referred to as the logical channel. In the above description, the RLC bearer may be referred to as an RLC leg.

Note that, in the above description, the PDCP entity may be the receiving PDCP entity and/or the transmitting PDCP entity.

Note that, in the above description, the RLC entity may be the UM RLC entity and/or the AM RLC entity and/or the TM RLC entity.

As described above, in an embodiment of the present invention, the terminal apparatus can maintain the state variables in the PDCP entity and/or the RLC entity even in multicasting, and therefore the terminal apparatus, the base station apparatus, and the method that can efficiently control the MBS by using NR can be provided.

The radio bearer in the above description may be a part or all of the DRB, the SRB, and the MRB. The radio bearer in the above description may be a part or all of the DRB, the SRB, and the MRB for delivery mode 1.

In the above description, expressions such as "link", "map", and "associate" may be replaced with each other.

In the above description, "the" may be replaced with "above-described".

In the above description, the "SpCell of the SCG" may be replaced with the "PSCell".

In the example of each processing or the example of the flow of each processing in the above description, a part or all of the steps need not be performed. In the example of each processing or the example of the flow of each processing in the above description, order of the steps may be different from each other. In the example of each processing or the example of the flow of each processing in the above description, a part or all of the processing in each step need not be performed. In the example of each processing or the example of the flow of each processing in the above description, order of processing in each step may be different from each other. In the above description, "to perform B based on satisfaction of A" may be replaced with "to perform B". In other words, "to perform B" may be performed independently of "satisfaction of A".

Note that in the above description, "A may be interpreted as B" may include the meaning that B is interpreted as A in addition to interpretation of A as B. In a case that the above description contains "C may be D" and "C may be E," this means inclusion of "D may be E." In a case that the above description contains "F may be G" and "G may be H," this means inclusion of "F may be H."

In the above description, in a case that a condition "A" and a condition "B" are conflicting conditions, the condition "B" may be expressed as "other" condition of the condition "A".

Various aspects of the terminal apparatus according to embodiments of the present invention will be described below.

(1) A terminal apparatus for communicating with a base station apparatus includes: a receiver configured to receive an RRC reconfiguration message including a first parameter and/or a second parameter from the base station apparatus; and a processing unit. The processing unit performs first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

(2) A base station apparatus for communicating with a terminal apparatus includes: a transmitter configured to transmit an RRC reconfiguration message including a first parameter and/or a second parameter to the terminal apparatus; and a processing unit. The processing unit causes the terminal apparatus to perform first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

(3) A method for a terminal apparatus for communicating with a base station apparatus includes: receiving an RRC reconfiguration message including a first parameter and/or a second parameter from the base station apparatus; and performing first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

(4) A method for a base station apparatus for communicating with a terminal apparatus includes: transmitting an RRC reconfiguration message including a first parameter and/or a second parameter to the terminal apparatus; and causing the terminal apparatus to perform first processing on each PDU session not to be added with the first parameter and/or the second parameter among the PDU sessions already configured for the terminal apparatus, based at least on that a parameter indicating a full configuration is included in the RRC reconfiguration message. The first parameter is a DRB configuration list parameter. The second parameter is an MRB configuration list parameter. The first processing includes indicating, to an upper layer, that a user plane resource for each PDU session not to be added has been released.

(5) The MRB configuration list parameter according to (1) to (4) is a parameter included in an RRC message transmitted from the base station apparatus to the terminal apparatus using a DCCH logical channel.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiment may be partially enabled by a computer. In such a case, a program for implementing such control functions may be recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that, the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus for communicating with a base station apparatus, the terminal apparatus comprising:

a receiver configured to receive, from the base station apparatus, a Radio Resource Control (RRC) reconfiguration message including a Multicast Broadcast Service Radio Bearer (MRB) configuration list parameter; and a processor, wherein the processor is configured to perform first processing for each session not to be added by the MRB configuration list parameter among sessions already configured for the terminal apparatus in a case that a parameter indicating a full configuration is included in the RRC reconfiguration message, and the first processing is to indicate, to an upper layer, that user plane resources for the each session not to be added by the MRB configuration list parameter have been released.

2. A base station apparatus for communicating with a terminal apparatus, the base station apparatus comprising:

a transmitter configured to transmit, to the terminal apparatus, a Radio Resource Control (RRC) reconfiguration message including a Multicast Broadcast Service Radio Bearer (MRB) configuration list parameter; and a processor, wherein the processor is configured to cause the terminal apparatus to perform first processing for each session not to be added by the MRB configuration list parameter among sessions already configured for the terminal apparatus in a case that a parameter indicating a full configuration is included in the RRC reconfiguration message, and the first processing is to indicate, to an upper layer, that user plane resources for the each session not to be added by the MRB configuration list parameter have been released.

3. A method for a terminal apparatus for communicating with a base station apparatus, the method comprising:

receiving, from the base station apparatus, a Radio Resource Control (RRC) reconfiguration message including a Multicast Broadcast Service Radio Bearer (MRB) configuration list parameter; and performing first processing for each session not to be added by the MRB configuration list parameter among sessions already configured for the terminal apparatus in a case that a parameter indicating a full configuration is included in the RRC reconfiguration message, wherein the first processing is to indicate, to an upper layer, that user plane resources for the each session not to be added by the MRB configuration list parameter have been released.

* * * * *